US012216225B2

United States Patent
Saqueb et al.

(10) Patent No.: US 12,216,225 B2
(45) Date of Patent: Feb. 4, 2025

(54) FACIA SUPPORTING AN ULTRA-WIDE RADAR FIELD-OF-VIEW

(71) Applicant: Aptiv Technologies AG, Schaffhausen (CH)

(72) Inventors: Syed An Nazmus Saqueb, Kokomo, IN (US); Armin Talai, Nuremberg (DE); Kevin Paul McReynolds, Noblesville, IN (US); Ricardo Cavazos, Kokomo, IN (US); Mark William Hudson, Russiaville, IN (US)

(73) Assignee: Aptiv Technologies AG, Schaffhausen (CH)

( * ) Notice: Subject to any disclaimer, the term of this patent is extended or adjusted under 35 U.S.C. 154(b) by 456 days.

(21) Appl. No.: 17/455,890

(22) Filed: Nov. 19, 2021

(65) Prior Publication Data
US 2022/0179039 A1   Jun. 9, 2022

Related U.S. Application Data

(60) Provisional application No. 63/162,389, filed on Mar. 17, 2021, provisional application No. 63/122,891, filed on Dec. 8, 2020.

(51) Int. Cl.
*G01S 7/02*    (2006.01)
*G01S 13/931*  (2020.01)

(52) U.S. Cl.
CPC ............ *G01S 7/027* (2021.05); *G01S 13/931* (2013.01); *G01S 2013/93271* (2020.01)

(58) Field of Classification Search
CPC ................... G01S 7/027; G01S 13/931; G01S 2013/93271
(Continued)

(56) References Cited

U.S. PATENT DOCUMENTS 3,432,859 A    3/1969  Jordan et al.
6,496,138 B1 * 12/2002 Honma ................. H01Q 19/08
                                              343/873
(Continued)

FOREIGN PATENT DOCUMENTS

WO    WO-2019198448 A1 * 10/2019

OTHER PUBLICATIONS

Hallendorff, "A Method of Radome Compensation With Broadband Capability," APL Technical Digest, Oct. 1964, pp. 10-16 (Year: 1964).*
(Continued)

*Primary Examiner* — James R Hulka
*Assistant Examiner* — Samarina Makhdoom
(74) *Attorney, Agent, or Firm* — Harness, Dickey & Pierce, P.L.C.

(57) ABSTRACT

This document describes facia, including parts of vehicles, for supporting an ultra-wide radar field-of-view, for example, in automotive contexts. The facia is configured as a radome for supporting an ultra-wide field-of-view with an antenna despite the facia obstructing a field of view. The facia has one exterior surface or interior surface this is a mostly smooth or has a pattern of hemispherical indentations or domes that are configured to reduce reflections off that surface and increase light transmission through the facia. The other of the exterior or interior surface, has a pattern of hemispherical indentations or domes that are configured to reduce reflections off that surface and further increase light transmission through the facia.

18 Claims, 20 Drawing Sheets

(58) Field of Classification Search
USPC .......................................................... 342/61
See application file for complete search history.

(56) References Cited

U.S. PATENT DOCUMENTS

| | | |
|---|---|---|
| 2005/0105075 A1 | 5/2005 | Gottwald et al. |
| 2006/0158369 A1* | 7/2006 | Shinoda .................. H01Q 3/06 342/146 |
| 2014/0091969 A1* | 4/2014 | Shi ......................... G01S 13/02 342/385 |
| 2015/0222011 A1* | 8/2015 | Kolak ..................... H01Q 1/42 156/60 |
| 2018/0013196 A1 | 1/2018 | Sakurai et al. |
| 2019/0190135 A1 | 6/2019 | Tokunaga et al. |
| 2020/0089246 A1* | 3/2020 | McGill, Jr. ........... G05D 1/0221 |
| 2020/0103523 A1* | 4/2020 | Liu ......................... G01S 13/87 |
| 2020/0262958 A1* | 8/2020 | Takahashi .............. C08L 33/00 |
| 2020/0264266 A1* | 8/2020 | Hassanien ............. G01S 7/2921 |
| 2020/0341486 A1* | 10/2020 | Dia ....................... G05D 1/0238 |
| 2020/0348408 A1* | 11/2020 | Peng ...................... G01C 21/28 |

OTHER PUBLICATIONS

Hossain et al., "Wideband, Wide Angle Radome Design for mm-Wave Automotive Radar Systems," 978-1-7281-0692-2/19/$31.00 © 2019 IEEE, AP-S 2019 (Year: 2019).*

"Extended European Search Report", EP Application No. 21212269.1, May 10, 2022, 8 pages.

Chen, "Frequency selective surface in millimeter-wave automotive radar radome applications", Aug. 2016, 4 pages.

He, et al., "A Thin Double-Mesh Metamaterial Radome for Wide-Angle and Broadband Applications at Millimeter-Wave Frequencies", Mar. 2020, pp. 2176-2185.

Hossain, et al., "Wideband, Wide Angle Radome Design for mm-Wave Automotive Radar Systems", Jul. 2019, pp. 659-.

Kim, et al., "Beam Expansion of Blind Spot Detection Radar Antennas Using a Radome with Defected Corrugated Inner Wall", Dec. 2017, 13 pages.

* cited by examiner

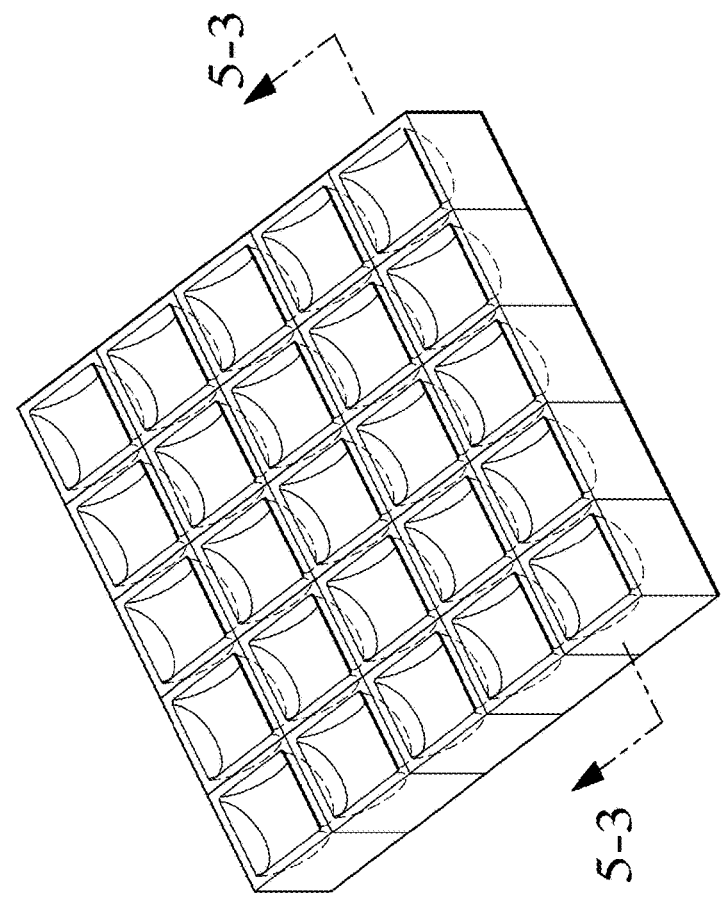
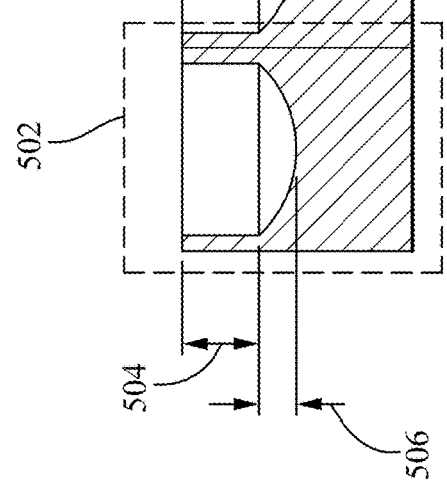
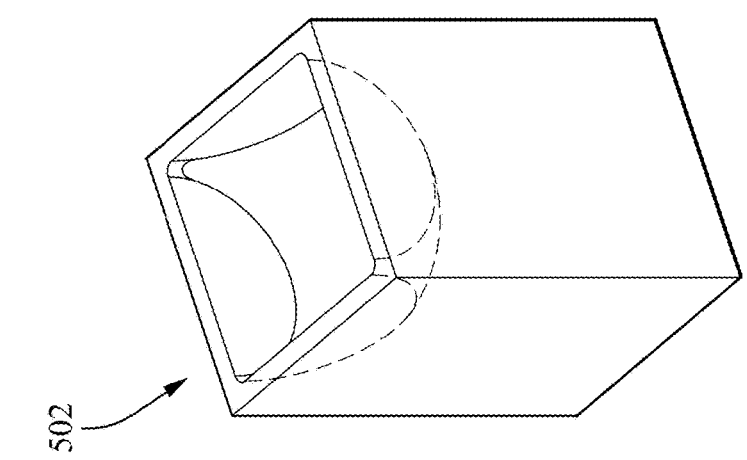
FIG. 5-1
FIG. 5-2
FIG. 5-3

FACIA SUPPORTING AN ULTRA-WIDE RADAR FIELD-OF-VIEW

CROSS-REFERENCE TO RELATED APPLICATION

This application claims the benefit under 35 U.S.C. 119(e) of U.S. Provisional Application No. 63/162,389, filed Mar. 17, 2021, and U.S. Provisional Application No. 63/122,891, filed Dec. 8, 2020, the disclosures of which are hereby incorporated by reference in their entireties herein.

BACKGROUND

Some automotive applications use planar-shaped antenna arrays. A radome made from a flat sheet of dielectric material can form a protective structure over these types of antenna arrays. A thickness of the dielectric material is kept at one wavelength at the antenna boresight (e.g., a zero-degree angle-of-incidence) to achieve a maximum transmission or a minimum reflection there. If the polarization of wave incident to the antenna is perpendicular to a plane of incidence for such a radome, then, because of its mostly flat surface, the transmission and reflection characteristics of the radome can deteriorate quickly at wide angles that are away from the boresight and out near the edges of the antenna field-of-view. Hence, for a vertically polarized antenna, an azimuth field-of-view may be limited to be narrower than plus or minus forty-five degrees, and for a horizontally polarized antenna, an elevation field-of-view may be similarly limited. The transmission and reflection characteristics of a flat radome can be improved by optimizing the dielectric thickness for a particular angle. Modifying the dielectric thickness near the edges to optimize the radome for angles that exceed forty-five degrees can result in severe degradation at the boresight, which is counterproductive. As radar technology advances to meet ever-demanding safety standards, automotive radar systems are being designed to have ultra-wide fields-of-view, which a mostly flat radome is unable to support.

SUMMARY

This document describes facia supporting an ultra-wide radar field-of-view. In one example, a system includes an antenna including an array of elements and a facia arranged between the antenna and field-of-view. Many parts of a vehicle can represent a facia in the context of this disclosure. A mirror housing, an emblem, a panel, a door, a bumper, a wheel, a radome, and a component housing, are some examples of facia. The facia may have multiple purposes, for example, to provide aesthetic, aerodynamic, and protective benefits, not just for protecting and directing transmissions to an antenna array, but also for protecting or improving performance of other sensitive components or parts of the vehicle that can benefit from being behind part of the vehicle.

In one example, a system includes an antenna including an array of elements directed towards a field-of-view, and a facia for a vehicle. The facia is configured to be arranged between the antenna and the field-of-view, the facia having an exterior surface exposed to the field-of-view and an interior surface that is opposite the exterior surface and exposed to the array of elements. The facia is configured as a radome having on at least one of the interior surface or the exterior surface a respective pattern of hemispherical indentations or domes that are configured to trap light, the trapping of the light being effective to reduce reflections off that surface and increase light transmission through the facia to support an ultra-wide field-of-view using the antenna despite the facia obstructing the field of view.

In another example, an apparatus includes a facia for a vehicle and configured to be arranged between an array of elements of an antenna and a field-of-view, the facia having an exterior surface exposed to the field-of-view and an interior surface exposed to the array of elements. In this example, the facia is configured as a radome for supporting an ultra-wide field-of-view with the antenna despite the facia obstructing the field of view. One of the exterior surface or the interior surface has a mostly smooth surface or a pattern of hemispherical indentations or domes that are configured to reduce reflections off that surface and increase light transmission through the facia. Another of the exterior surface of the interior surface has a pattern of hemispherical indentations or domes that are configured to reduce reflections off that surface and further increase light transmission through the facia.

This document also describes a method for operating a radar using the above-summarized system and apparatus and computer-readable storage medium, including instructions that, when executed, configure a processor to perform this method and other methods set forth herein, in addition to describing other systems and apparatuses configured to perform the above-summarized method and the other methods set forth herein.

This Summary introduces simplified concepts of facia (e.g., portions of vehicles positioned as radomes within a radar transmission or return path) for supporting an ultra-wide radar field-of-view, which are further described below in the Detailed Description and Drawings. This Summary is not intended to identify essential features of the claimed subject matter, nor is it intended for use in determining the scope of the claimed subject matter. That is, one problem solved by the described facias is in overcoming deterioration of transmission characteristics at the edges of an ultra-wide field-of-view of a planar antenna array. Although primarily described in the context of radar systems, the facias that act as radomes described herein can be applied to sensor systems (e.g., lidar, ultra-sound) other than radar where it is desired to prevent signal deteriorations at the edges of an ultra-wide field-of-view.

BRIEF DESCRIPTION OF THE DRAWINGS

The details of one or more aspects of a facia supporting an ultra-wide radar field-of-view are described in this document with reference to the following figures, which often use same or hyphenated numbering throughout to reference like features and components:

FIGS. 2-1 and 2-2 illustrate optical properties of a facia supporting an ultra-wide radar field-of-view, in accordance with techniques of this disclosure;

FIGS. 3-1, 3-2, 3-3, 4-1, 4-2, 4-3, 5-1, 5-2, 5-3, 6-1, 6-2, and 6-3 illustrate example structures of facia supporting an ultra-wide radar field-of-view, in accordance with techniques of this disclosure;

FIGS. 7, 8-1, 8-2, 8-3, 8-4, 8-5, 8-6, 9, 10, 11-1, and 11-2 illustrate transmission characteristics of facia supporting an ultra-wide radar field-of-view in accordance with techniques of this disclosure;

FIGS. 12, 13, 14-1, and 14-2 illustrate additional aspects of facia supporting an ultra-wide radar field-of-view, in accordance with techniques of this disclosure; and FIGS. 15-1, 15-2, 16-1, 16-2, 17-1, 17-2, and 17-3 illustrate additional example structures of facia supporting an ultra-wide radar field-of-view, in accordance with techniques of this disclosure.

DETAILED DESCRIPTION

Overview

Figure 1:
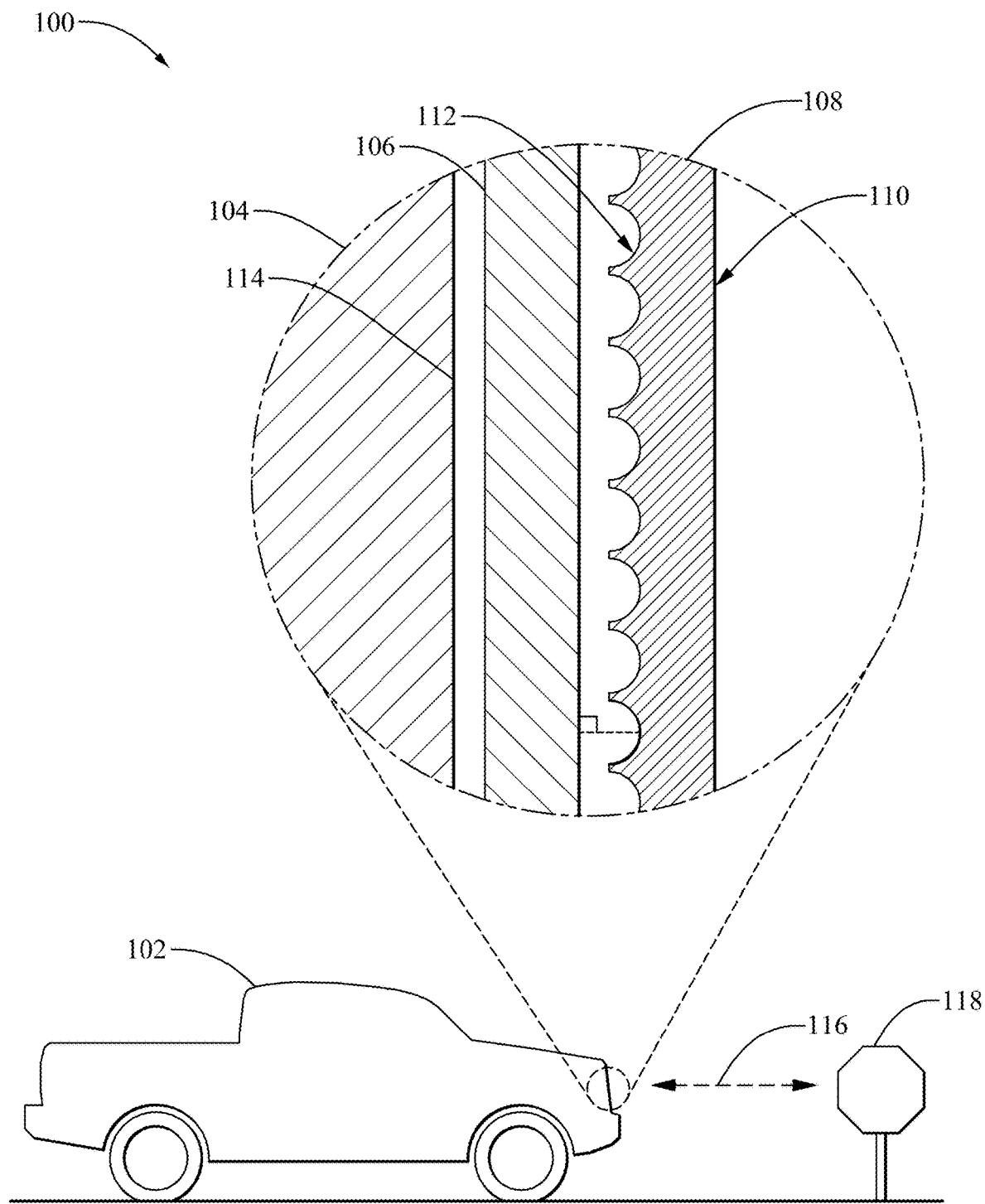
FIG. 1 illustrates an example environment in which a facia supporting an ultra-wide radar field-of-view, in accordance with techniques of this disclosure.

As already mentioned, some radome designs use flat sheets or slabs of dielectric material (e.g., PBT) for covering flat antenna arrays. A thickness of this dielectric material is optimized for detections at the boresight (e.g., a zero-degree angle of incidence) at the expense of poor transmissions near the edges of the field-of-view. Various improvements to previous flat radome designs have been tried, with varying degrees of success in improving transmission characteristics of the radome at the edges of an ultra-wide field-of-view.

In one example, periodic pyramidal structures are formed on both sides of the radome. This pattern of sharp peaks and valleys improves transmission characteristics when compared to the standard flat radomes, particularly at the edges of the field-of-view. Another known approach to improving transmission characteristics in a dielectric-radome, even at angles of incidence that are away from the boresight, is to use a corrugated-rib structure, which includes a one-dimensional array of alternating thick and thin sections of dielectric material. Even with some benefit, however, all of these structures can be difficult to manufacture from dielectric (e.g., plastic) material. The corrugated slot design creates a thin section of material that spans the entire width of the radome, which can cause warpage and bowing of the radome when produced in high volume. Creating pyramid structures can be particularly difficult because the tooling used to form these sharp edges and corners dulls over time, which may trigger frequent pauses in manufacturing to stop and re-tool. Furthermore, the valleys formed between the pyramidal structures on the outside surface of the radome can collect dirt and debris, which can reduce accuracy and reliability.

An additional way to improve a radome for a flat antenna array includes carefully forming the radome to have a precise variation in interior shape. This variation in shape is designed specifically to eliminate problems other radomes have due to opposing parallel surfaces. The variation in shape can absorb reflections, thereby preventing them from interfering with radiated signals. The drawback to interior shaping of the radome is that the shape extends across all of the individual antenna elements that include the transmit and receive arrays. Generally, the antenna elements are closely spaced, and therefore a thickness of the radome at a specific angle may be different for each element, which decreases the radar performance.

In addition to using dielectrics, other materials and combinations of materials have been tried. For example, adding a metal layer that imparts a periodic metal pattern onto one or both sides of a dielectric layer can improve transmission characteristics. Despite some benefits to transmission characteristics, use of these additional materials adds complexity and costs, and their adoption cannot reliably ensure good transmission characteristics across an ultra-wide field-of-view. The metal layer approach increases loss through the radome and triggers additional fabrication steps that add cost and complexity.

In contrast to the aforementioned radomes, this document describes facia (e.g., a radome, a bumper, a panel, a car part, or portion thereof) for supporting an ultra-wide field-of-view, which may also be referred to as an instrument field-of-view that is ultra-wide. A facia (e.g., bumper, panel, emblem, other vehicle part) can be configured as a radome for an antenna including an array of elements. A mostly smooth exterior surface may be exposed to a field-of-view, with an opposite interior surface exposed to the antenna elements. The interior surface includes a pattern of hemispherical indentations that are configured to trap light. These hemispherical defects are sub-wavelength and configured to trap light, which is effective to reduce reflections off of the interior surface and increase light transmission through the facia to support an ultra-wide field-of-view. The facia is designed for ease of manufacturing, as well as to keep the hemispherical structures and antenna clear of debris, as a radome does. The interior surface of the radome maximizes transmission characteristics both at the boresight of the radome and at the edges of the ultra-wide field-of-view. In other examples, the interior surface is mostly smooth, and the pattern of hemispherical indentations are on the exterior surface exposed to the field-of-view. This is effective to trap light and reduce reflections off of the exterior surface and increase light transmission through the facia to support an ultra-wide field-of-view. In other examples, a combination of pattern of hemispherical indentations are on the interior and exterior surfaces, which is effective to trap light and reduce reflections off of the exterior surface as well as reduce reflections off of the interior surface, and increase light transmission through the facia to support an ultra-wide field-of-view. In any of these examples, the pattern of hemispherical structures can be a combination of indented or outdented hemispherical structures, relative to either interior or exterior surface.

Example Environment

FIG. 1 illustrates an example environment including a facia supporting an ultra-wide radar field-of-view, in accordance with techniques of this disclosure. In the depicted environment 100, a sensor system 104 is mounted to, or integrated within, a vehicle 102. Although illustrated as an automobile, the vehicle 102 can represent other types of vehicles and machinery (e.g., a motorcycle, a bus, a tractor, a semi-trailer truck, watercraft, aircraft, or other heavy equipment), including manned and unmanned systems that may be used for a variety of purposes. The vehicle 102 can travel on a road, which may be obstructed by an object 118. In FIG. 1, the vehicle 102 is traveling down a road, and the sensor system 104 of the vehicle 102 has a field-of-view that encompasses the object 118.

FIG. 1 shows an exploded, cross-sectional view of the sensor system 104. For ease of description, the sensor system 104 is described primarily as being a radar or radar system. In some examples, the sensor system 104 can include a lidar, an ultrasound, or other sensor technology that relies on a radome supporting an ultra-wide field-of-view.

The sensor system 104 includes an antenna 106, a facia 108 (which may also be referred to as a radome but may generally be any part of a vehicle), and electronics 114. The sensor system 104 transmits and receives signals 116 and, based on these, determines whether a collision between the vehicle 102 and the object 118 is likely to occur and, if so, output a warning or cause the vehicle to take evasive action.

The electronics 114 can include a processor, computer-readable storage media, and other hardware or circuitry that is configured to perform functions by transmitting and receiving signals 116 through the facia 108. For example, based on the signals 116, a processor of the electronics 114 determines whether the object 118 is in a travel-path of the vehicle 102, and, in response to determining that the object 118 is outside the travel-path, the processor refrains from outputting a collision warning.

The antenna 106 may include a plurality of antenna elements. These elements may be arranged in a grid array, for example, a two-dimensional array. The antenna 106 can be a complete array of elements at every position of the grid or a sparse array that includes antenna elements in only some of the positions of the two-dimensional array or grid.

The facia 108 is formed from any part of the vehicle 102 that is arranged between the antenna 106 and a field-of-view. The facia 108, in blocking the field-of-view from the antenna 106, acts as a radome to protect the antenna 106 without disrupting electromagnetic transmissions. The facia 108 can be any shape.

For example, with the antenna 106 including a planar array, the facia 108 may be a flat portion of the vehicle 102 that is arranged between the antenna 106 and the object 118 in the field-of-view. An exterior surface 110 of the facia 108 faces outward towards the field-of-view and the object 118. An interior surface 112 of the facia 108 is arranged parallel to the array of elements in the antenna 106. This interior surface 112 is opposite the exterior surface 110.

In some examples, as shown in FIG. 1, the interior surface 112 includes a pattern of hemispherical indentations that are configured to trap light. Each hemispherical indentation is sized to less than one wavelength of the center frequency of the antenna 106 and the sensor system 104. For example, the interior surface 112 is lined with hemispherical indentations that open to the array of antenna elements of the antenna 106. When the hemispherical indentations trap light, they are effective at reducing reflections off of the interior surface 112 that might interfere with the signals 116 that are detected at the array. This trapping of light is further effective to increase light transmission through the facia 108 to support an ultra-wide radar field-of-view.

In some cases, instead of the interior surface 112, the exterior surface 110 includes a pattern of hemispherical indentations or other features on the exterior surface 110, for reducing reflections at the exterior surface 110 and/or increasing light transmission through the facia 108. In other cases, the exterior surface 110 and the interior surface 112 may each include a respective pattern of features for reducing reflections at that surface, and for increasing light transmission through the facia 108. In this regard, the exterior surface 110 and the interior surface 112 can be configured to trap reflecting light and/or increase light transmission through the facia 108 using a combination of surface features on each of the two surfaces 110 and 112.

General Structure

Figure 2:
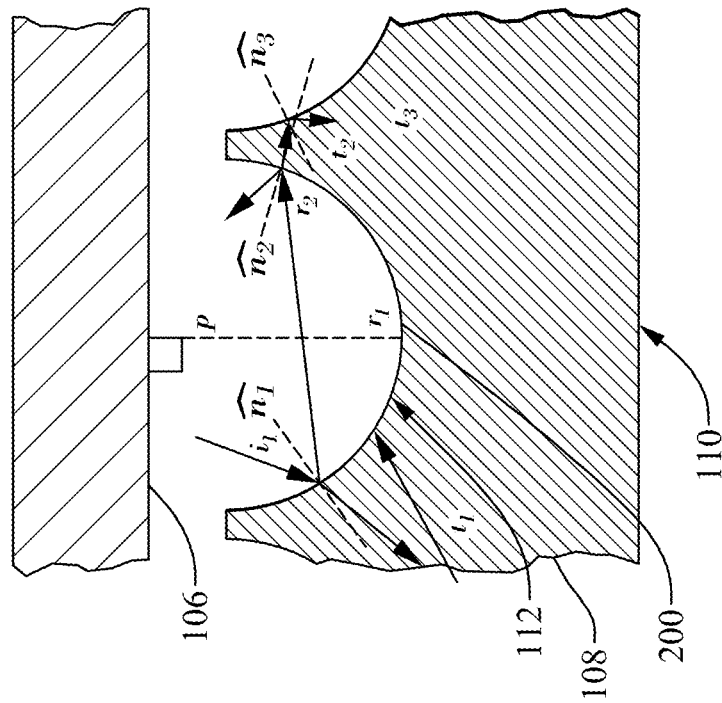
Figures 1, 2:
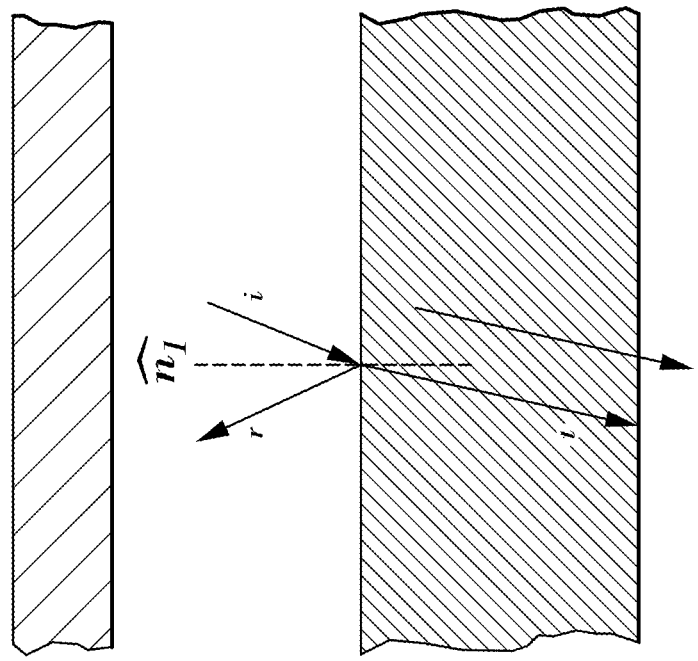

FIGS. 2-1 and 2-2 illustrate optical properties of a facia supporting an ultra-wide radar field-of-view, in accordance with techniques of this disclosure. FIG. 2-1 shows optical properties of a standard, dielectric slab of material that represents part of the vehicle 102 that is configured as a radome. FIG. 2-2 shows optical properties of the facia 108, which is in accordance with the techniques of this disclosure, is also configured as a radome for the antenna 106, in support of an ultra-wide radar field-of-view.

For a simple, flat radome, such as that shown in FIG. 2-1, an incident ray i at a particular angle can produce one reflected ray r and one transmitted ray t. As shown in FIG. 2-2, each hemispherical indentation includes an opening 200 that is perpendicular to the antenna 106. The opening 200 forms a horizontal plane between the antenna 106 and the interior surface 112, which is perpendicular to a polarization of an incident wave to the facia 108. The opening 200 and the interior surface 112 are configured to form a plane of incidence p that is perpendicular to the facia 108. That is, with this structured surface with hemispherical indentations, for the same incident ray i, the reflected ray $r_1$ bounces off of the inside of the structure and is forced to become an incident ray. This incident ray produces $r_2$ and $t_2$. The second transmitted ray $t_2$ then undergoes total internal reflection and produces only reflected ray $t_3$. Though this is a reflected ray, the reflected ray $t_3$ actually contributes to the overall transmission of the wave and is thus designated as a transmitted ray. This light-trapping by the radome of FIG. 2-2 reduces overall reflection of the incident surface and increases overall transmission through the facia 108 when compared to the radome of FIG. 2-1.

Example Structures

FIGS. 3-1, 3-2, 3-3, 4-1, 4-2, 4-3, 5-1, 5-2, 5-3, 6-1, 6-2, and 6-3 illustrate example facias configured as radomes for supporting an ultra-wide radar field-of-view, in accordance with techniques of this disclosure. Each one of the facias shown in FIGS. 3-1, 3-2, 3-3, 4-1, 4-2, 4-3, 5-1, 5-2, 5-3, 6-1, 6-2, and 6-3 includes a pattern of hemispherical indentations. The pattern may be periodic, the pattern may be repeating, the pattern may be on an exterior surface of the facia that faces outward towards a field-of-view, the pattern may be on an interior surface of the facia, opposite the exterior surface, that faces inward towards an antenna, and/or the pattern may be on the interior and exterior surfaces, in various combinations of the above. It is clear, therefore, that there are many possible hemispheric patterns including: indentations that are cylindrical in shape or varying from one row or column to the next, offsetting indentations instead of in-line, and other patterns of hemispherical indentations that may be random or pseudo-random in position. In other cases (e.g., see FIGS. 12, 15-1, 15-2, 16-1, 16-2, 17-1, 17-2, and 17-3), the patterns of hemispheric shapes, include domes, protrusions, and/or bump-outs, in addition, or instead of the indentations.

Each hemispherical indentation, dome, protrusion, and/or bump-out is sized to less than one wavelength of the center frequency of radar signals 116 of a transceiver of the system. To maximize transmission for a wide field-of-view at a nominal frequency, each unit cell that makes up an individual element of the pattern has a radius of the hemisphere r, a length L, and a width W, and a total thickness t of the radome can be adjusted accordingly. With a known dielectric constant Dk and a dissipation factor Df, the parameters r, L, W, and t may be tuned.

Figures 1, 2, 3:
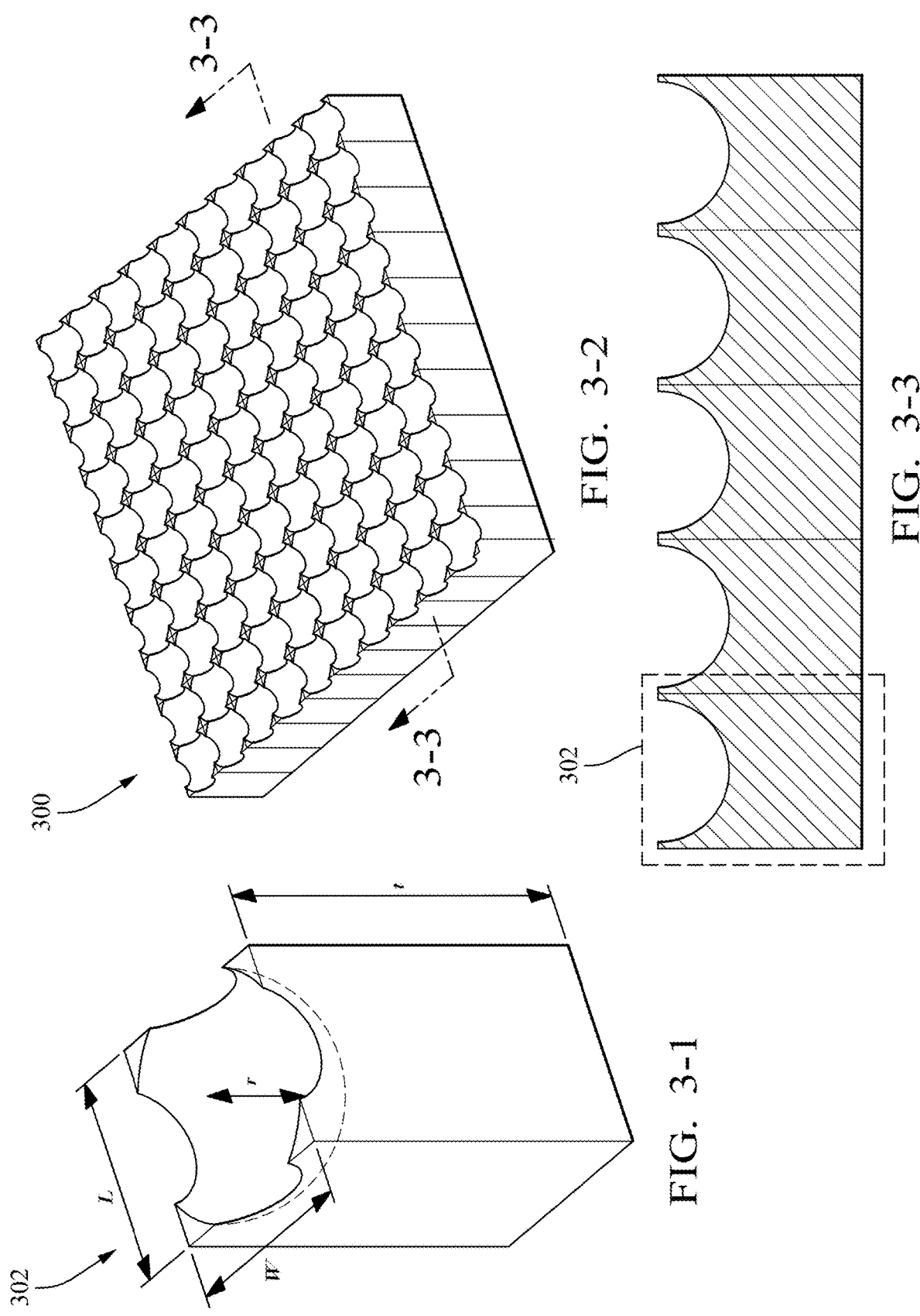

For example, turning first to FIGS. 3-1 to 3-3, a radome 300 can be formed into a facia or other part of a vehicle. The radome 300 includes a dielectric material (e.g., PREPERM® RB260). The radome 300 is formed from a pattern of unit cells 302. Each unit cell 302 includes a hemispherical indentation that forms the pattern of hemispherical indentations in the radome 300.

With PREPERM® RB260 as the radome material, the dielectric constant Dk equals 2.6 and the dissipation factor Df equals 0.003. The parameters r, L, W, and t may be tuned to: L equals W equals 0.92 millimeter (mm), r equals 0.52 mm, and t equals 1.7 mm. The center frequency for the sensor system 104 and the signals 116 is chosen to be seventy-seven gigahertz. The one-way transmission versus azimuth angle for the structured radome 300 is plotted in FIG. 7 and compared with three cases: 1) a flat radome with a thickness t selected to achieve maximum transmission at boresight (e.g., t is approximately 2.43 mm), 2) a flat radome with a thickness t chosen to achieve maximum transmission at sixty degrees, and 3) a flat radome with a thickness t selected to achieve maximum transmission at sixty degrees without degrading transmission at boresight by more than 0.1 decibel. In FIGS. 3-1 to 3-3, the radius r of each identical unit cell 302 in the pattern of hemispherical indentations exceeds half of an outer dimension (e.g., the length L and the width W) of the unit cell. The thickness t of each unit cell 302 may exceed the other outer dimensions (e.g., L and W) of the unit cell. In the radome 300, as in with other example facia or radomes supporting ultra-wide radar field-of-view, either surface of the radome 300 can include a similar pattern of hemispherical domes, protrusions, and/or bump-outs extending from, as opposed to indenting into, the radome 300. These domes, protrusions, and/or bump-outs can be formed of unit cells with similar and/or inverse dimensions and properties as the unit cells 302.

Figures 2, 4:
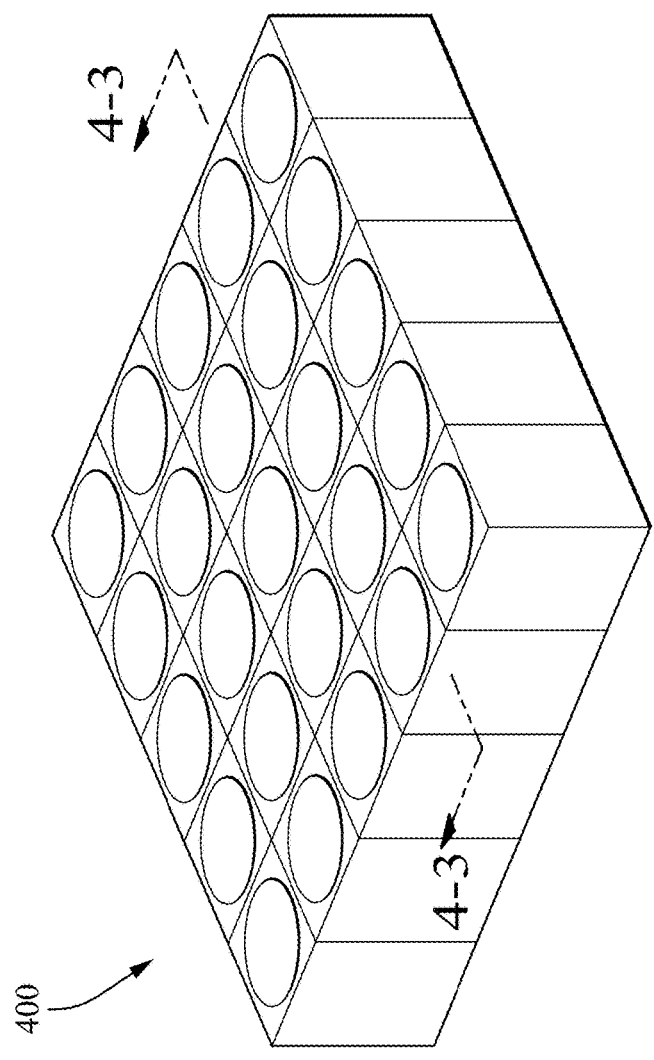
Figures 3, 4:
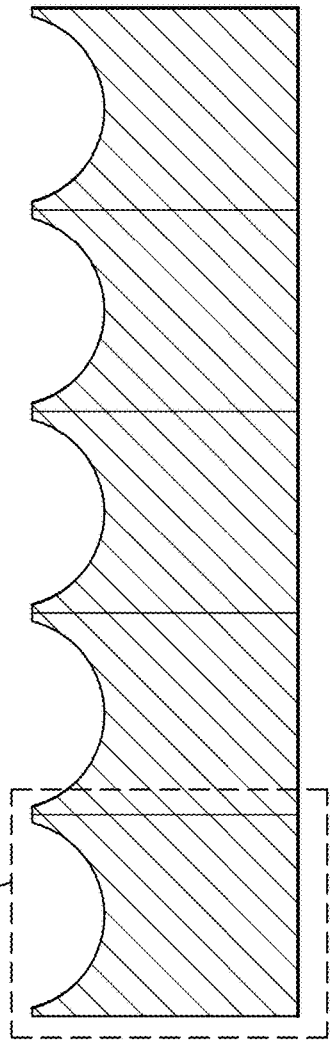
Figures 1, 4:
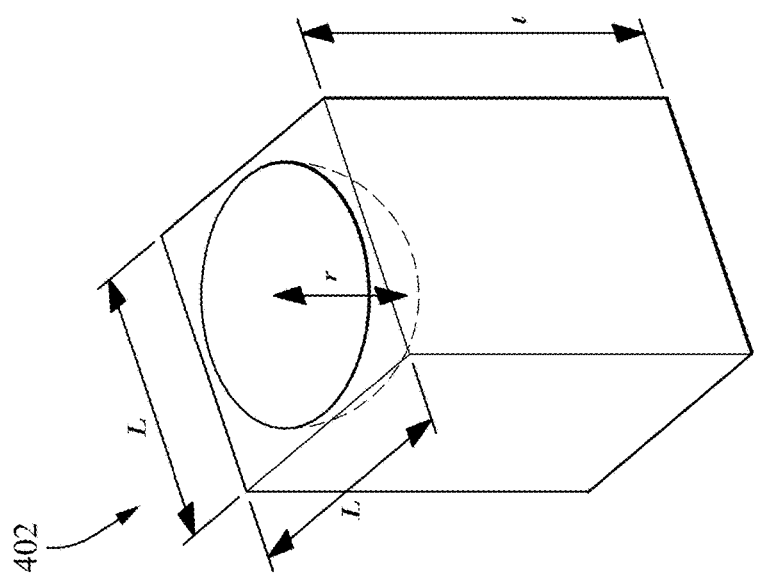

Next, turning to FIGS. 4-1 to 4-3, a radome 400 can be formed into a facia or other part of a vehicle to include an arrangement of unit cells 402. Each of the unit cells 402 may be identical, including an equal portion of the dielectric material. Non-identical unit cells with gradient diameters (e.g., diameters that gradually change) and/or gradient depths (e.g., depths that gradually change) may also be used for further tuning of the radome 400 transmission and reception characteristics.

In FIGS. 4-1 to 4-3, the radius r of each unit cell 402 in the pattern of hemispherical indentations is approximately identical between two unit cells and is less than half of the outer dimension (e.g., the length L and the width W) of the unit cell. Either surface of the radome 400 can include a similar pattern of hemispherical domes, protrusions, and/or bump-outs extending from, as opposed to indenting into, the radome 400, and arranged similarly as the unit cells 402. The thickness t of each unit cell 402 may exceed the other outer dimensions (e.g., L and W) of the unit cell.

While primarily shown with identical unit cells, any of the example facia 108, and radomes 300, 400, in addition to radomes 500 and 600 and 1500 to 1700, to come, can include non-identical unit cells with gradient radius or depths to further tune the radomes to the desired characteristics. In other words, the facia 108, and the radomes 300 to 600, and the radomes 1500 to 1700 may include two or more groups of hemispherical indentations, domes, protrusions, and/or bump-outs. A first group of hemispherical indentations from the pattern of hemispherical indentations may include identical unit cells each having an equal portion of dielectric material. A second group of hemispherical indentations may instead include a gradient radius or a gradient depth that is different than a radius or a depth of the hemispherical indentations from the first group. These and other characteristics may be tuned to achieve desired radome transmission and reception characteristics.

FIGS. 5-1, 5-2, 5-3, 6-1, 6-2, and 6-3 illustrate that each unit cell 502 of a radome 500 formed int a facia and each unit cell 602 of a radome 600 formed by a facia may be defined by a uniform size and shape that configures each unit cell 502, 602 to trap a portion of light. For example, in FIGS. 5-1, 5-2, and 5-3, each unit cell 502 includes a tunnel opening 504 between each hemispherical indentation 506 and the field-of-view. In FIGS. 6-1, 6-2, and 6-3, each unit cell 602 includes a tunnel opening 604 between each hemispherical indentation 606 and the field-of-view. In FIGS. 5-1, 5-2, and 5-3, the tunnel opening 504 to each hemispherical indentation 506 is a rectangular opening (e.g., a square opening), whereas in FIGS. 6-1, 6-2, and 6-3, the tunnel opening 604 to each hemispherical indentation 606 is a circular opening (e.g., round, ovular). Each hemispherical indentation 506 is recessed at a depth into the interior surface 112 approximately equal to a depth of the tunnel opening 504. Each hemispherical indentation 606 is recessed at a depth into the interior surface 112 approximately equal to a depth of the tunnel opening 604. The overall shape and size of the facia 108, and the radomes 300 to 600, and the radomes 1500 to 1700 can vary depending on a particular use case and without having to machine pyramid shapes with sharp and accurate corners, manufacturing is easier than manufacturing other radomes.

Example Characteristics

Figures 1, 2, 3, 6:
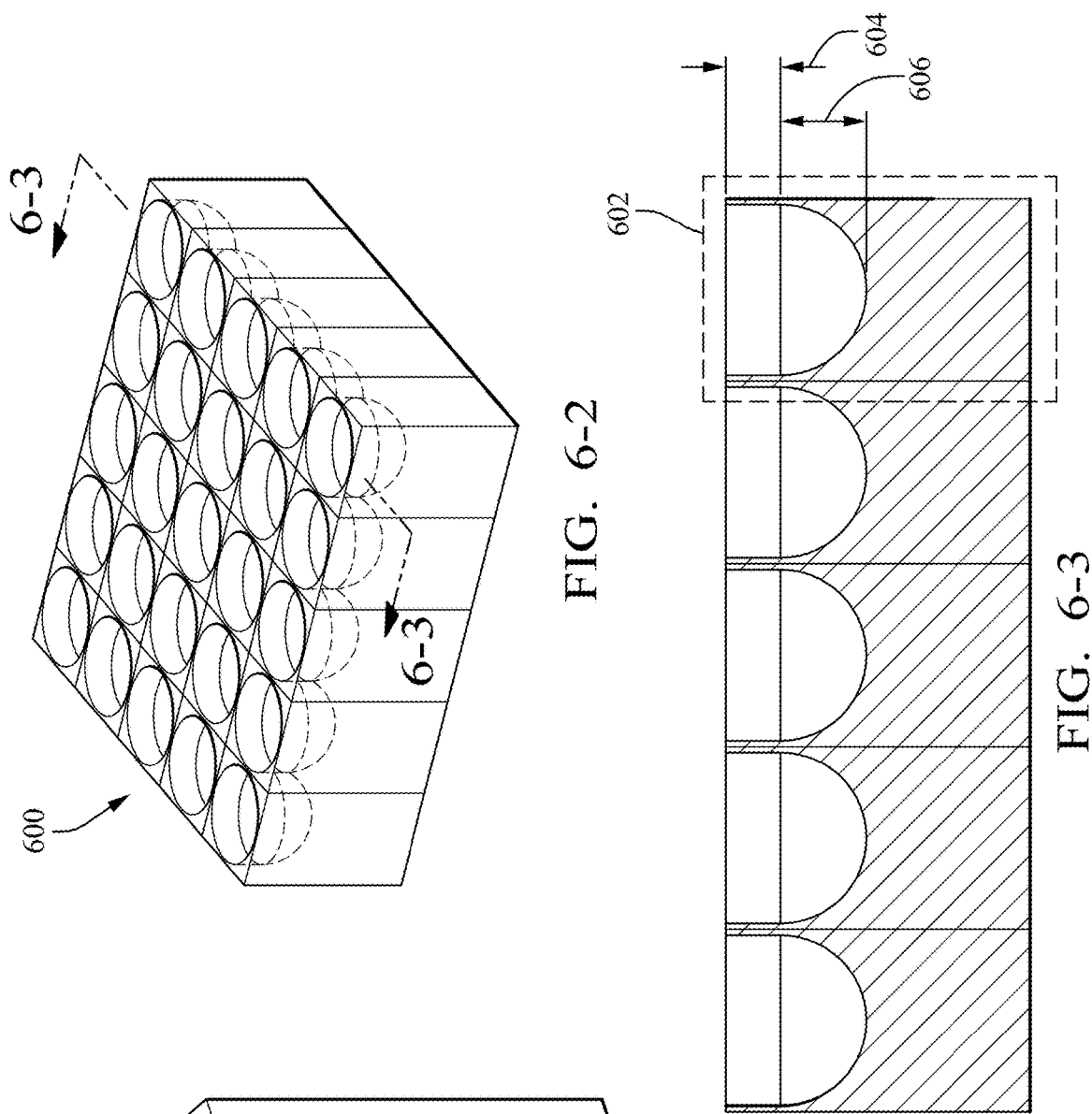
Figure 7:
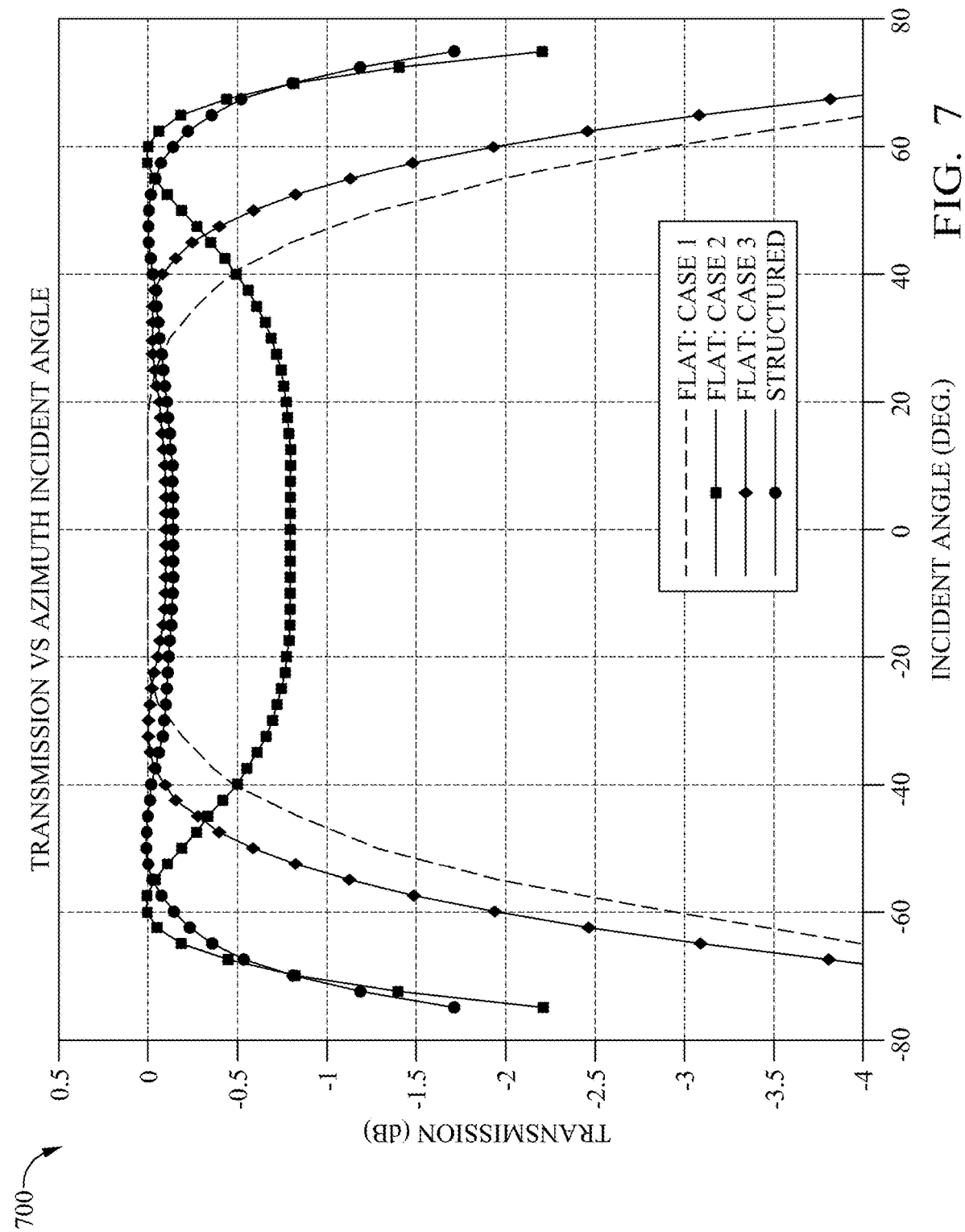

FIGS. 7, 8-1, 8-2, 8-3, 8-4, 8-5, 8-6, 9, 10, 11-1, and 11-2 illustrate transmission characteristics of a facia supporting an ultra-wide radar field-of-view, in accordance with techniques of this disclosure. For example, FIG. 7 shows transmission in decibels (dB) versus azimuth incident-angle when operating a radar transceiver with a center frequency of around seventy-seven gigahertz. Case 1 represents a facia configured as a radome supporting an ultra-wide radar field-of-view where thickness is set to a value for achieving maximum transmission at the boresight. As seen from the solid curve in the plot, this radome exhibits very small loss at the boresight. However, transmission starts to roll off rapidly for angles that exceed forty-five degrees. Further, one-way loss at sixty degrees is around three decibels. Case 2 represents the scenario where the thickness for a flat radome is optimized for maximum transmission at sixty degrees. However, transmission drops severely at the boresight.

Because signal transmission at the boresight determines the maximum tracking range of a radar, many radar applications operate under an assumption that a radome produces a transmission loss of not more than 0.1 decibel at the boresight. Case 3 represents such a scenario; the thickness of the flat radome is optimized to have around 0.1-decibel transmission loss at the boresight. Note, in this case, transmission at sixty degrees may improve compared to case 1. Nevertheless, case 3 still has a high loss of around two decibels. Cases 1 through 3 show how other radomes that do not accord with techniques of this disclosure cannot simultaneously achieve acceptable transmission at both the boresight and at greater than forty degrees, much less at greater than sixty degrees. The pattern of hemispherical indentations, domes, protrusions, and/or bump-outs as described herein overcomes these issues and produces a 'flat' transmission curve throughout a wide field-of-view. Transmission loss is around 0.1 decibels, both at the boresight and at sixty degrees, which is a significant improvement from the other three cases.

In FIG. 7, it is clear that the transmission characteristics of each of the facia 108, and the radomes 300 to 600, and the radomes 1500 to 1700 indicates a transmission gain at an incident angle of zero degrees to be approximately the same as a transmission gain at an incident angle with a magnitude exceeding forty degrees. The transmission characteristics of each of the facia 108, and the radomes 300 to 600, and the radomes 1500 to 1700 at boresight is approximately equal to transmission characteristics of the radome at greater than forty-five degrees. Furthermore, the transmission characteristics of each of the facia 108, and the radomes 300 to 600, and the radomes 1500 to 1700 at boresight is approximately equal to transmission characteristics of the radome at approximately sixty degrees. The performance of the facia 108, and the radomes 300 to 600, and the radomes 1500 to 1700 has been analyzed over a variety of radar operating frequencies and manufacturing tolerances and compared with a flat radome case improves transmissions at both the boresight and sixty degrees (i.e., case 3). With a thickness t is around 2.55 mm, the facia 108, and the radomes 300 to 600, and the radomes 1500 to 1700 have characteristics as shown in FIGS. 8-1 through 8-6.

Figures 1, 8:
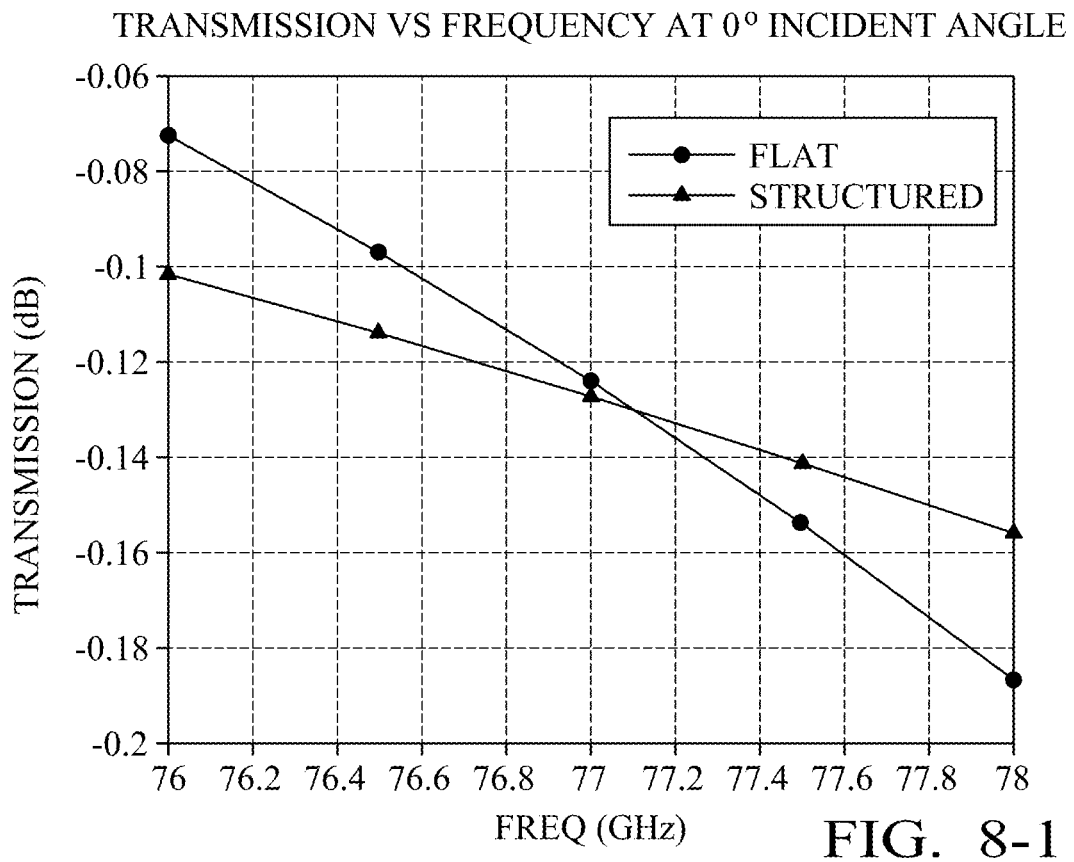
Figures 2, 8:
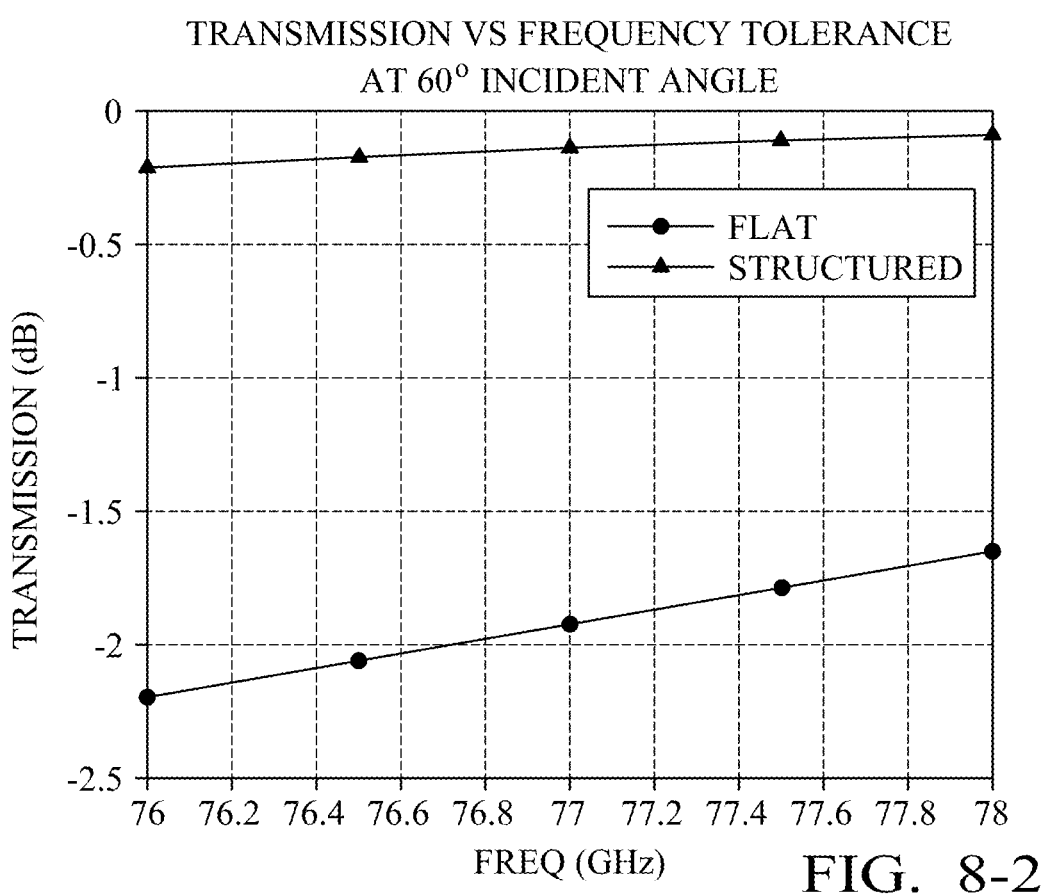
Figures 3, 8:
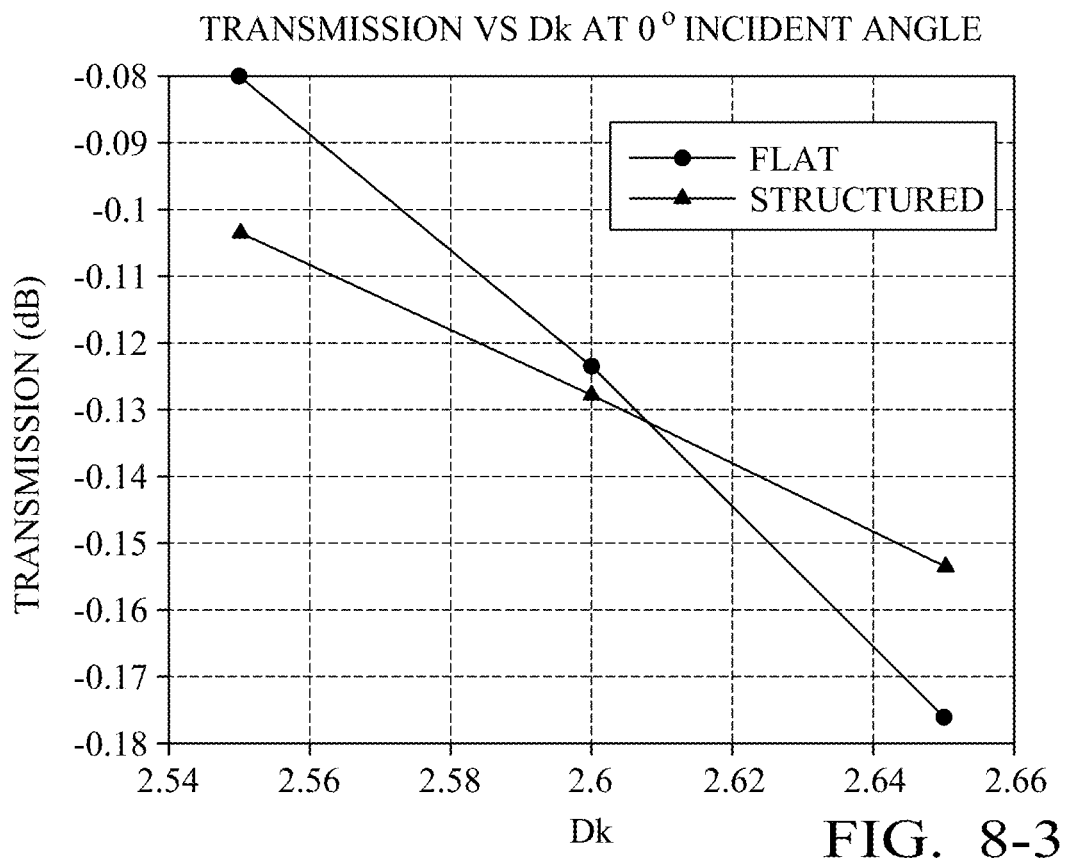
Figures 4, 8:
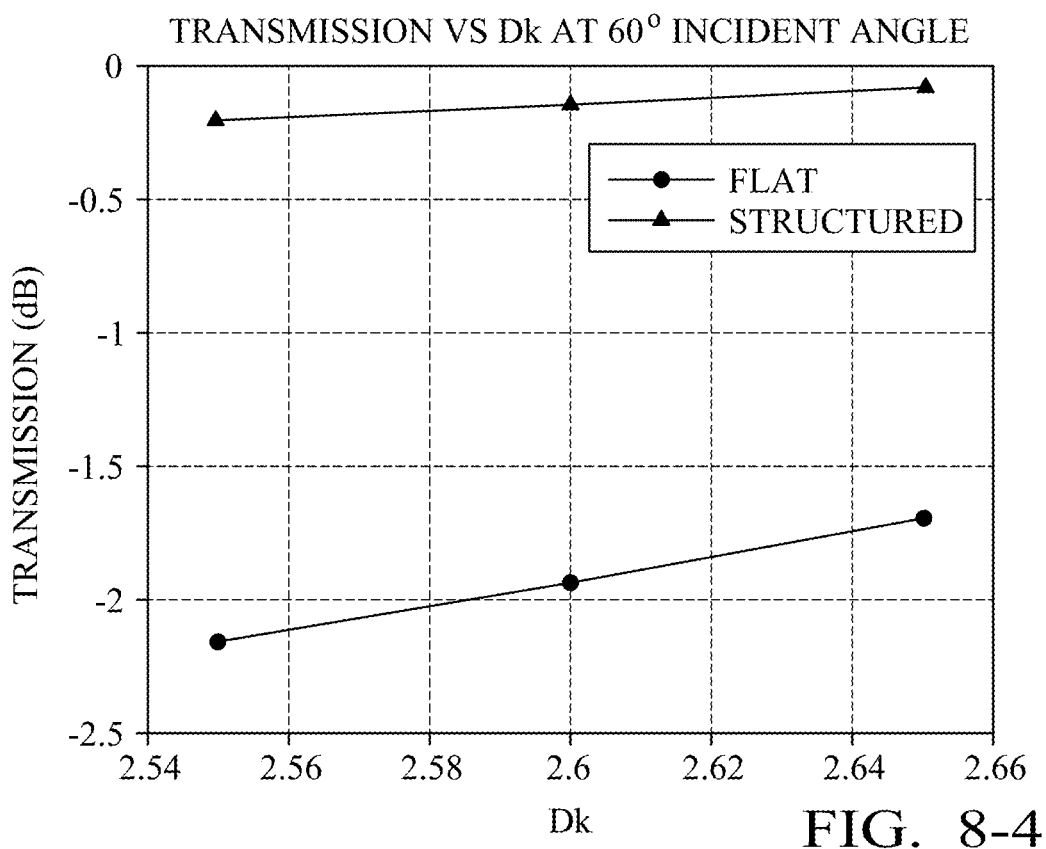
Figures 5, 8:
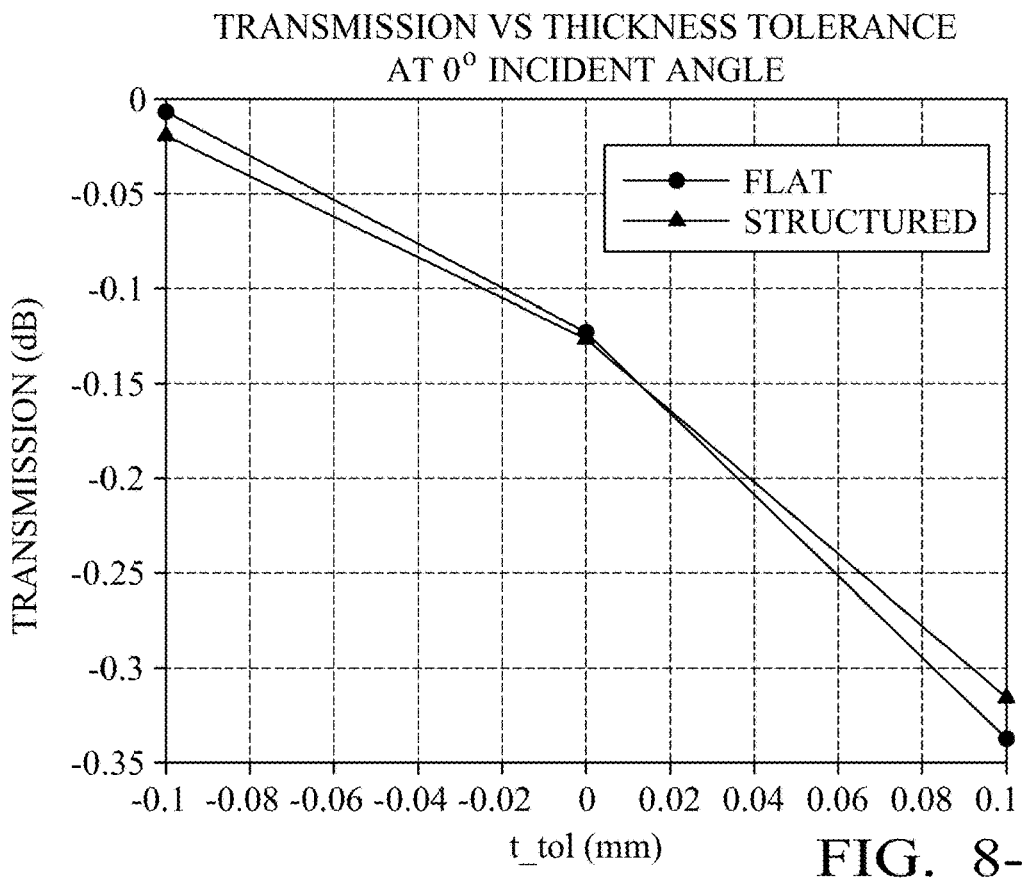
Figures 6, 8:
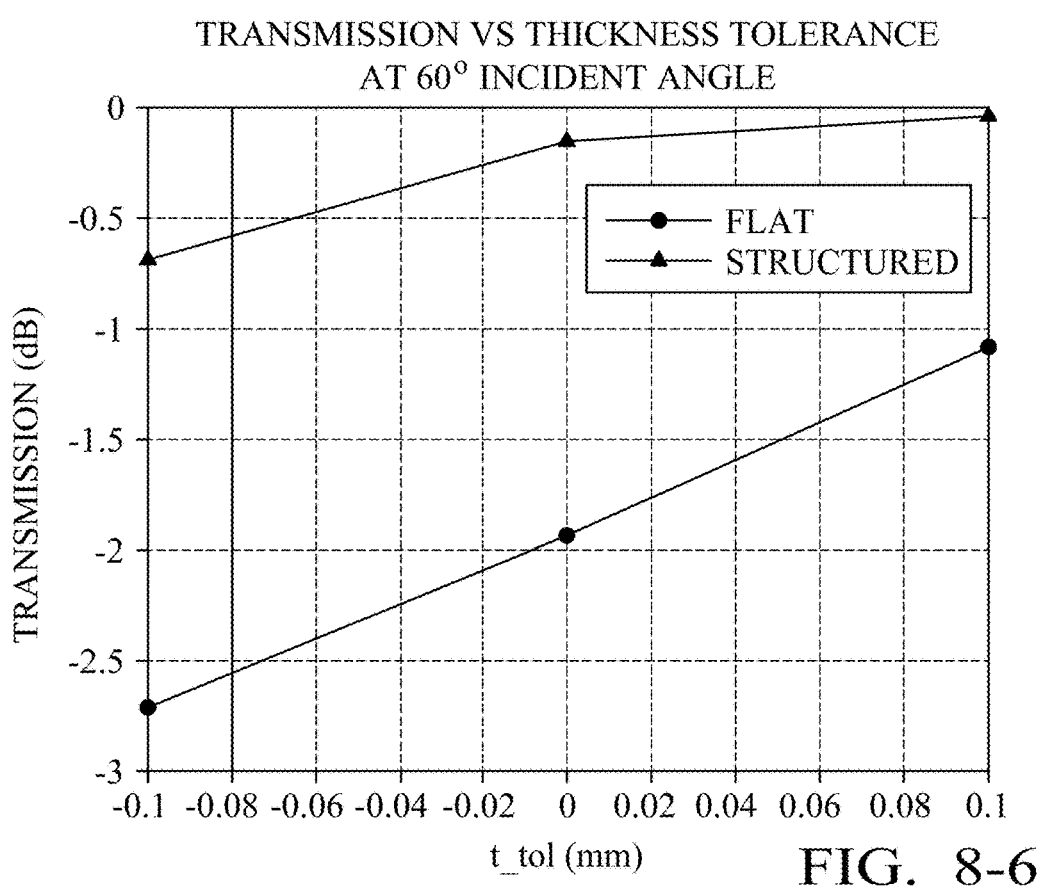

In FIGS. 8-1 and 8-2, transmission at the boresight and at sixty degrees is simulated for a band between seventy-six and seventy-eight gigahertz. A smaller variation in transmission for both angles is observed in the facia 108, and the radomes 300 to 600, and the radomes 1500 to 1700 than compared to the other flat radome. Similarly, variation of transmission for manufacturing Dk is shown in FIGS. 8-3 and 8-4 and tolerance of the thickness t is depicted in FIGS. 8-5 and 8-6, respectively. A shown, the facia 108, and the radomes 300 to 600, and the radomes 1500 to 1700 perform better than the other flat radomes in both cases.

Figure 9:
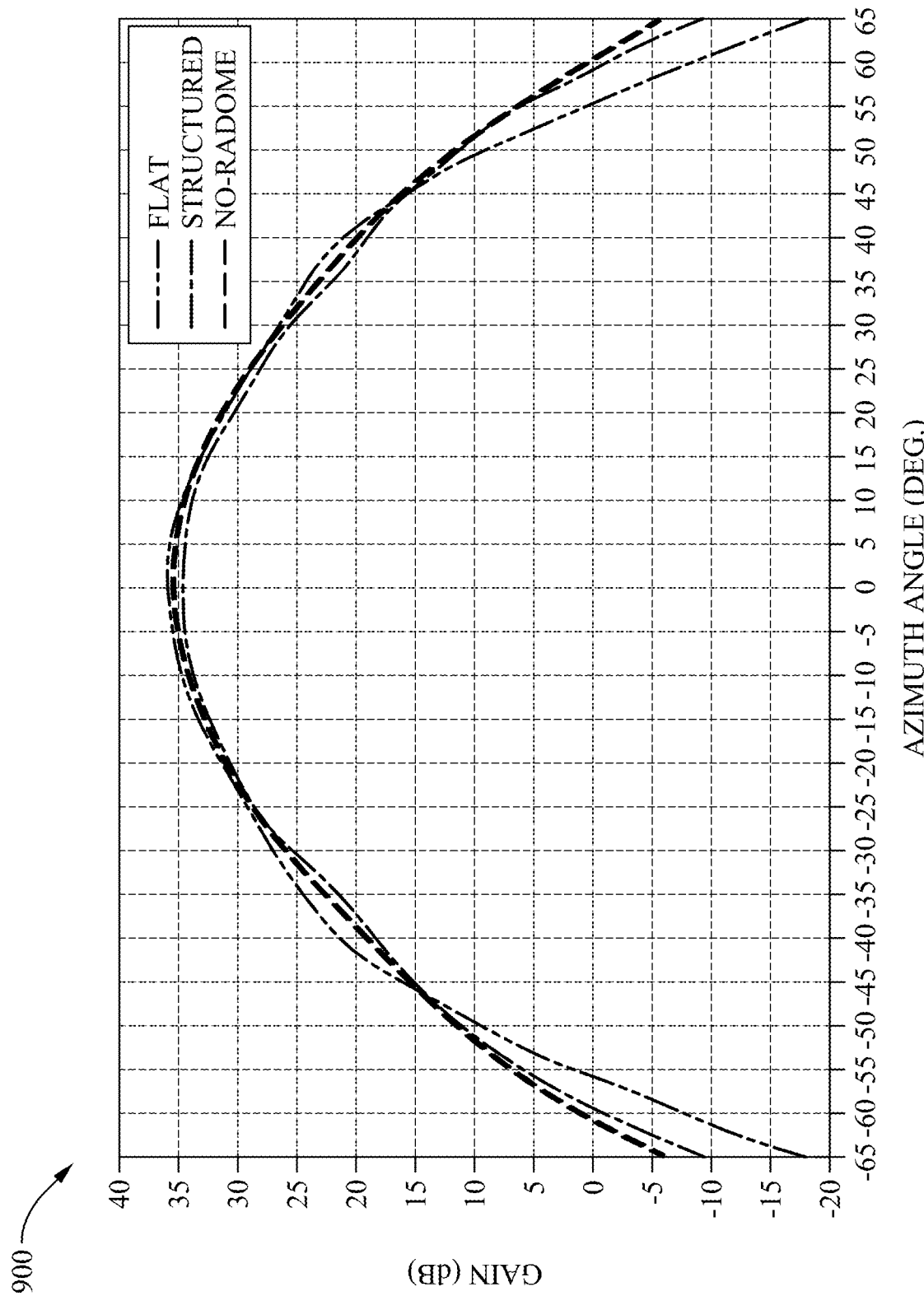

To further verify the effectiveness of the facia 108, and the radomes 300 to 600, and the radomes 1500 to 1700, consider FIG. 9. FIG. 9 shows the two-way azimuth gain pattern averaged over all transmit-receive channels at seventy-seven gigahertz. As can be seen, the structure of the facia 108, and the radomes 300 to 600, and the radomes 1500 to 1700 exhibit similar properties with respect to gain as is during a no-radome case, up to sixty degrees. As shown in FIG. 9, the properties of the structured facia 108, and the radomes 300 to 600, and the radomes 1500 to 1700 more closely match the no-radome case than a flat radome.

Figure 10:
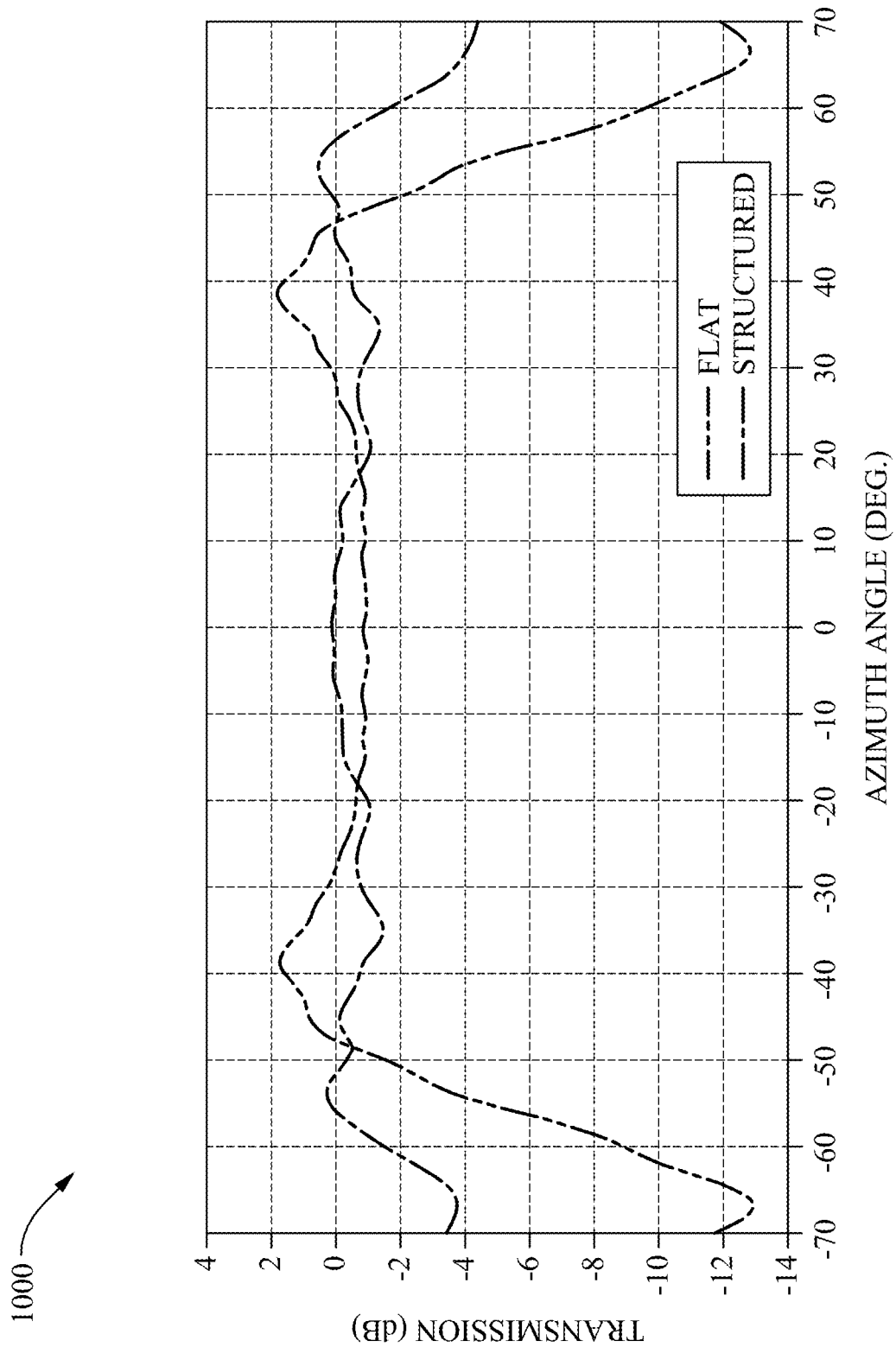

Transmission versus azimuth angle is also extracted from this simulation, considering no radome case as the reference. This result is shown in FIG. 10, and it matches with an infinite periodic structure simulation using plane-wave excitation. Values smaller than 0 dB indicate that the radome reduces the transmitted two way power.

Figures 1, 11:
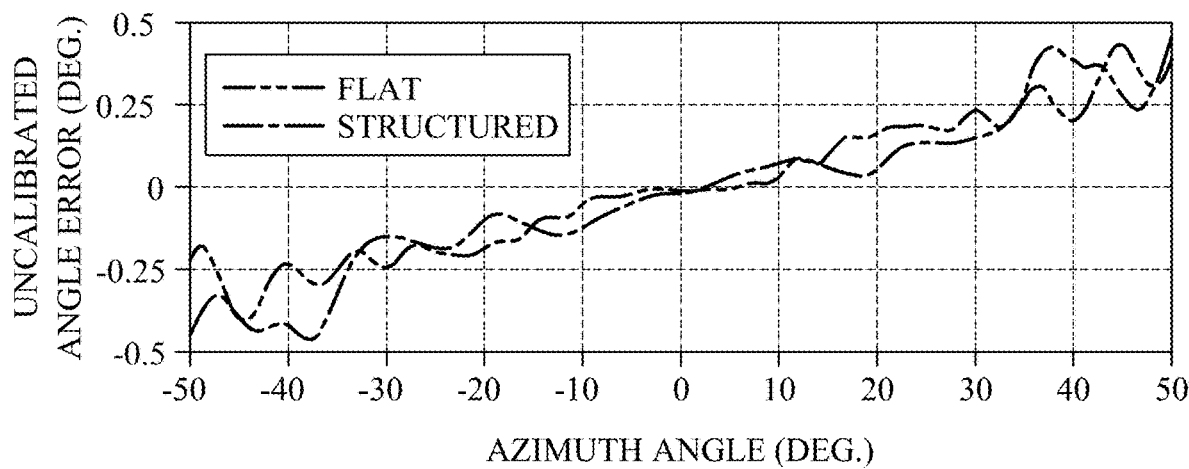
Figures 2, 11:
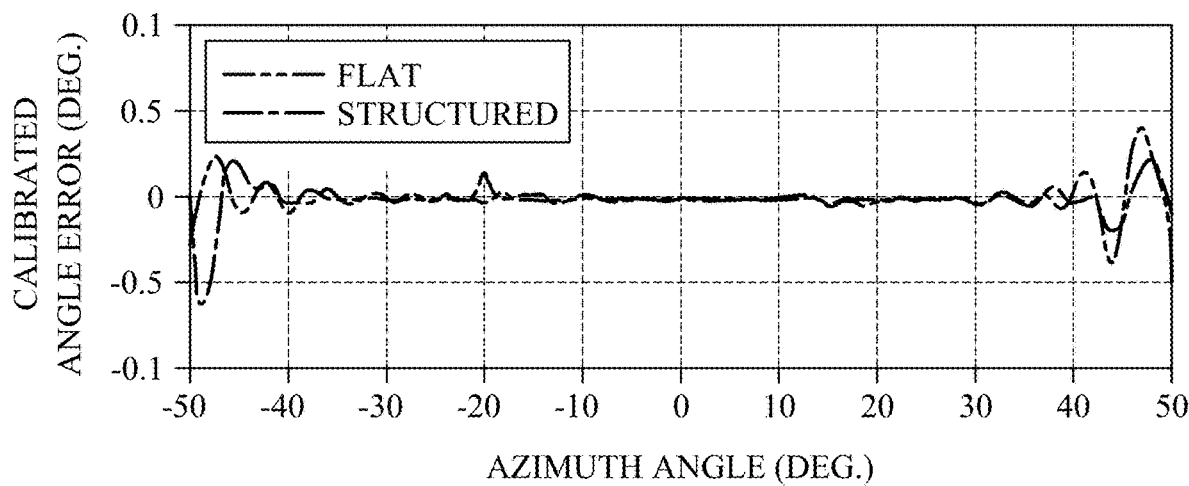

An angle error is computed for structured-radome, flat-radome, and no-radome cases and shown in FIG. 11-1. In FIG. 11-1, the computed angle errors versus azimuth angle for the facia 108, and the radomes 300 to 600, and the radomes 1500 to 1700 are shown, elevation angle errors (although not shown) can similarly be computed and verified. The result in FIG. 11-2 shows that the structures applied to the facia 108, the radomes 300 to 600, and the radomes 1500 to 1700, provide similar angle accuracy as the flat radome for both calibrated and uncalibrated angle calculations.

Hemispherical surface indentations, domes, protrusions, and/or bump-outs on a flat surface can be combined to achieve different results. Due to the simplicity of the structure, this might interest some other applications on a vehicle, beyond facia and radome applications.

FIGS. 12, 13, 14-1, and 14-2 illustrate additional aspects of facia supporting an ultra-wide radar field-of-view, in accordance with techniques of this disclosure. These additional aspects can be used in combination with the examples described above or used alone depending on application or positioning on a vehicle.

Figure 12:
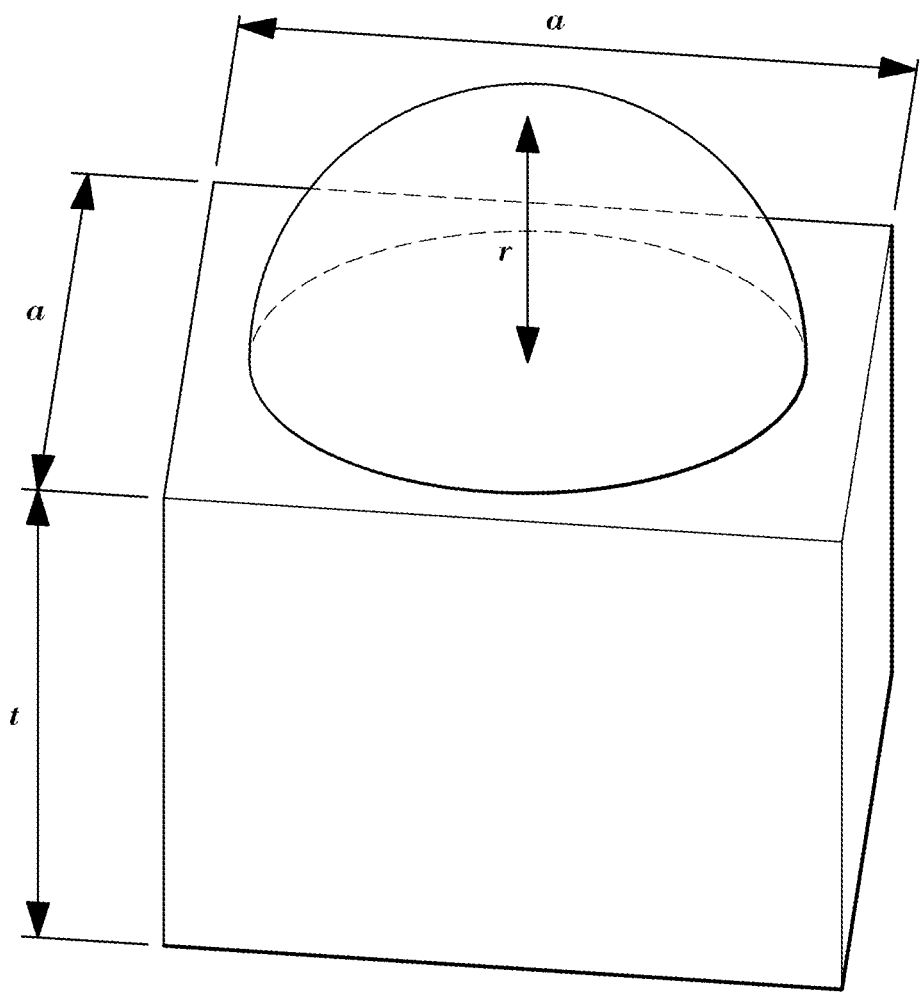

FIG. 12 shows a single cell of a dome, protrusion, and/or bump-out structure, for application on facias or radomes formed of facias, which may be any surface in between an antenna of a transmitting sensor and a field-of-view, such as a bumper, body panel, an emblem.

Figure 13:
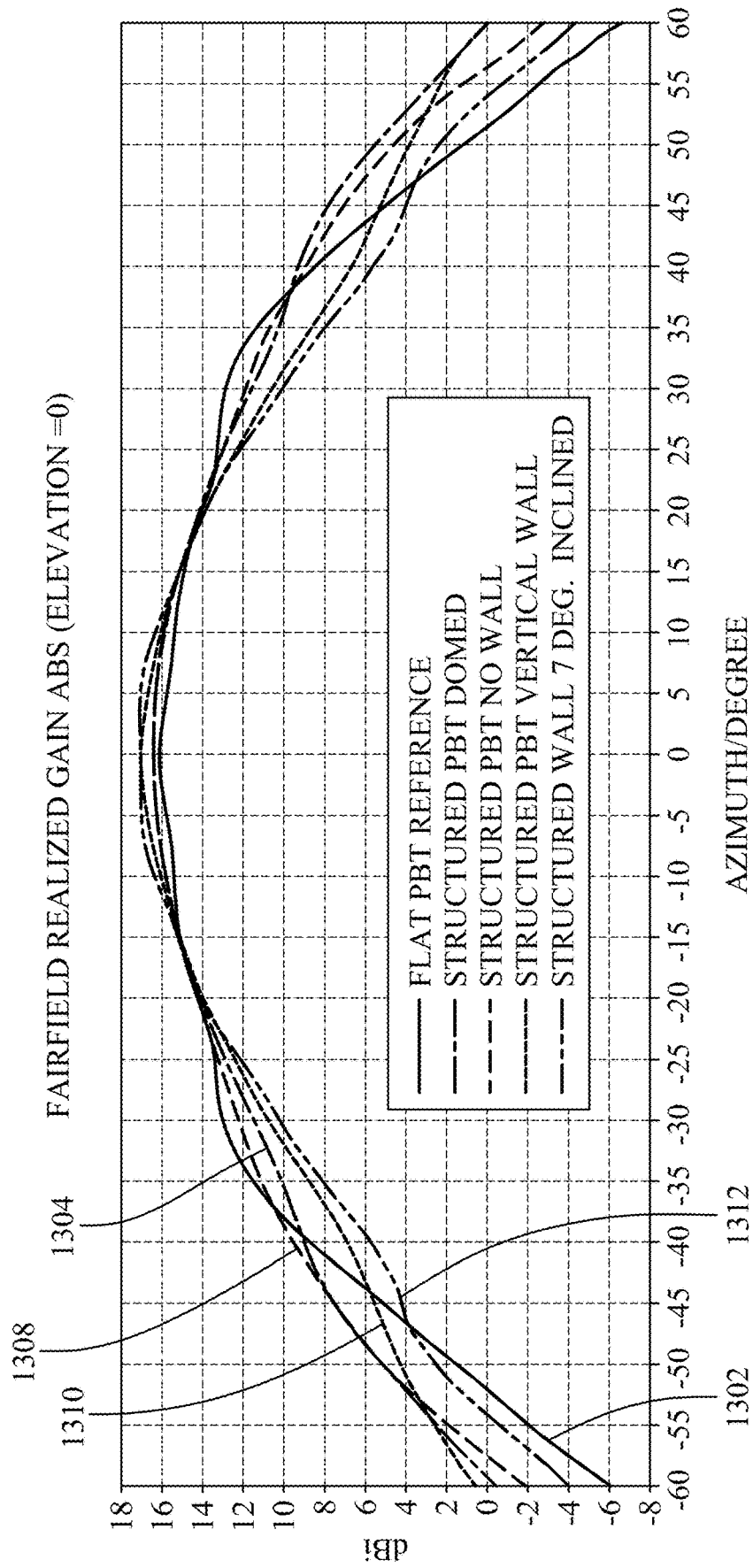

FIG. 13 shows a simulated one-way transmission of a vertical polarity patch arrays with different structures attached to facia (e.g., radomes) supporting radar field-of-views. FIG. 13 depicts simulation results comparing the effects by different structuring approaches on the radome using a state of the art radome PBT material with 30% glass fiber filler. A curve 1302 is flat radome reference, showing the exemplary antenna gain pattern with a non-structured flat PBT radome, which is unlike the facia 108, or any of the radomes 300 to 600, or the radomes 1500 to 1700 with patterns of hemispherical indentations, domes, protrusions, and/or bump outs. The flat radome shows the steepest roll off towards high incidence angles +/−60°. A curve 1304 shows the achieved transmission when a pattern of hemispherical domed, protruded, or bumped-out hemispherical shapes according to FIG. 12 are distributed at the radome in front of the antenna, illustrated in FIG. 14-1.

Figures 1, 14:
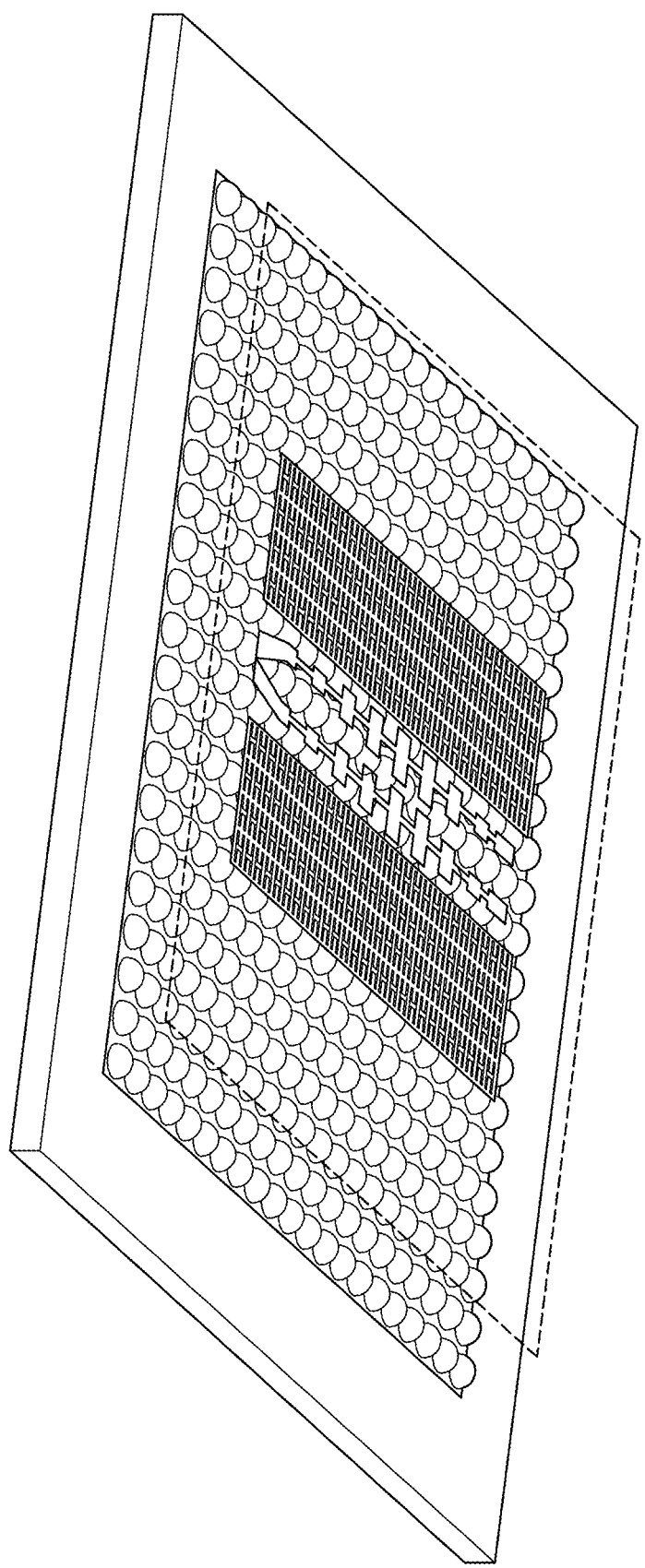
Figures 2, 14:
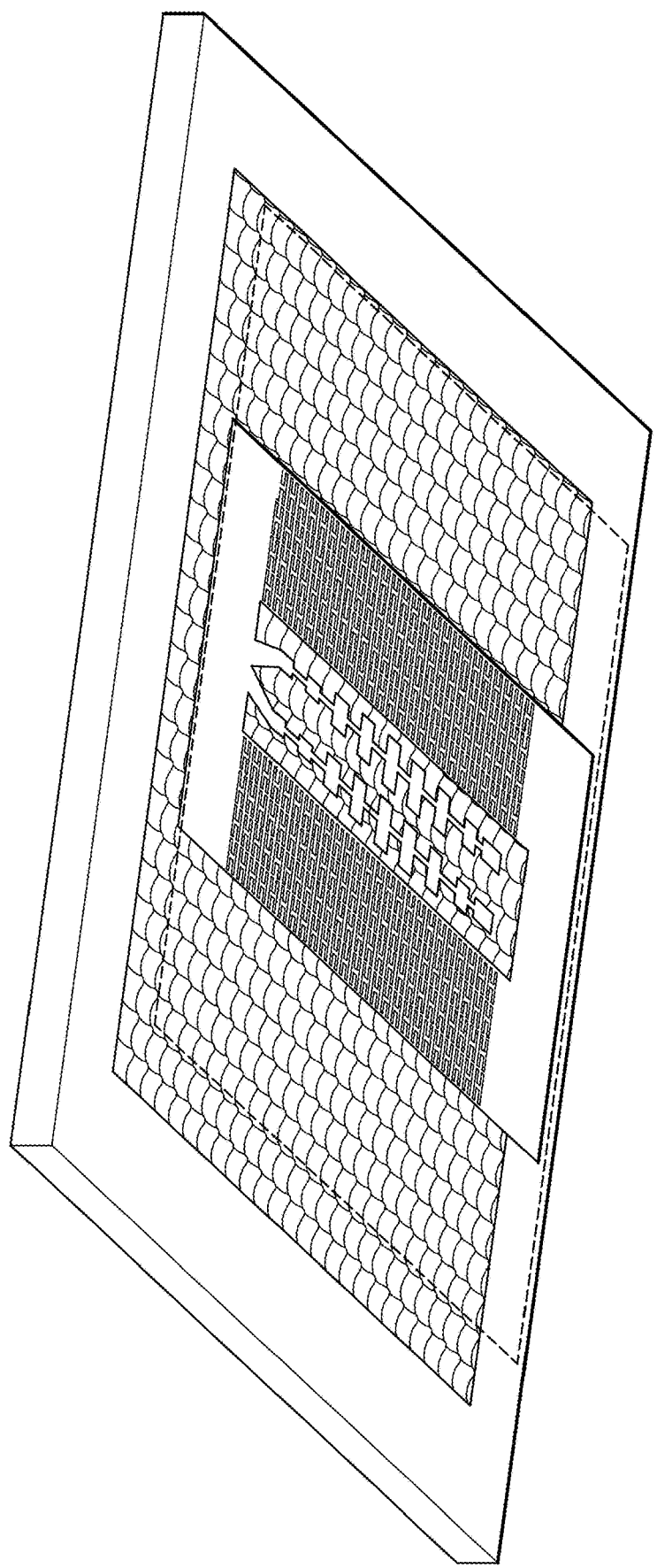

FIG. 14-1 shows a simulation model of V-Pol patch array using a radome with a pattern of hemispherical domed, protruded, or bumped-out hemispherical shapes. (e.g., curve 1304 in FIG. 13). As can be seen, the domed, protruded, or bump-out geometry attached to a radome increases vertical-polarity transmission above 40° incidence angles compared to a flat radome. The one-way gain difference of 6 dB at 60° incidence angle corresponds to a doubled range coverage compared to the flat radome reference (e.g., the curve 1302 from FIG. 13), which can be achieved by this structuring approach using a pattern of hemispherical domed, protruded, or bumped-out hemispherical shapes. Another structuring at the radome using inserted Spherical Cutouts in between walls is depicted in FIG. 14-2. Curves 1310 and 1312 show that this geometry (with walls) achieves similar transmission performance as using a pattern of hemispherical indentations (e.g., curve 1308 in FIG. 13), domes (e.g., as curve 1306 in FIG. 13), protrusions, bump-outs, or combination thereof.

FIG. 14-2 shows a model of vertical-polarity patch array using structured PBT radome by inserted spherical cutouts without walls in between (e.g., curve 1306 in FIG. 13). Depending on the desired radome application domain or location (e.g., facia, bumper, emblem, etc.), and the chosen material with respect to dielectric constant Dk, an inserted spherical structuring or a pattern of hemispherical domed, protruded, or bumped-out structuring may be a preferred radome solution. The hemispherical domed, protruded, or bumped-out shape inhibits (e.g. less probability for) agglomeration of dirt and dust, which might be important for a sensor system, such as a radar, position behind or at a bumper. Depending on the chosen material Dk, the presented hemispherical domed, protruded, or bumped-out structuring approaches may differ by manufacturing price (e.g., geometrical accuracy) and mechanical robustness (e.g., thickness).

Further Example Structures

Figures 1, 15:
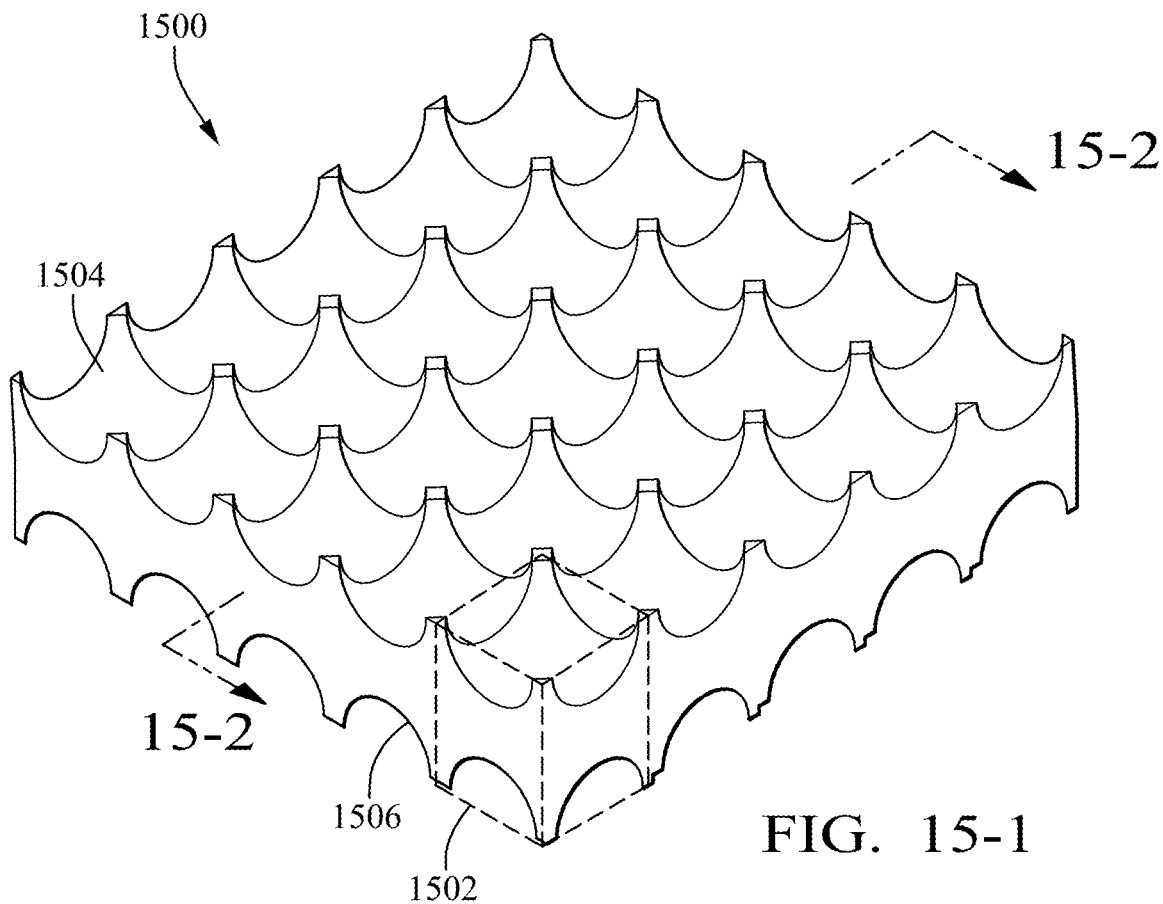
Figures 2, 15:
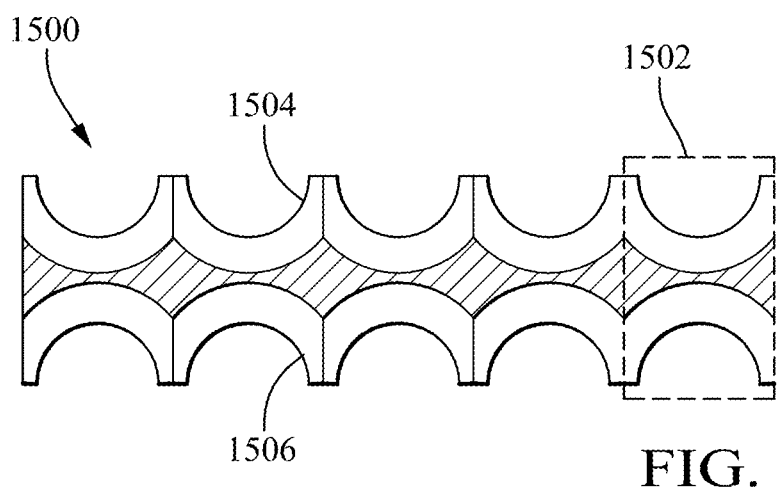

FIGS. 15-1, 15-2, 16-1, 16-2, 17-1, 17-2, and 17-3 illustrate example facias configured as radomes for supporting an ultra-wide radar field-of-view, in accordance with techniques of this disclosure. FIGS. 15-1 and 15-2 includes a radome 1500 having a pattern of hemispherical indentations, FIGS. 16-1 and 16-2 includes a radome 1600 having a pattern of hemispherical domes, protrusions, or bump-outs, and FIGS. 17-1, 17-2, and 17-3 includes a radome 1700 having both patterns used in combination. The patterns of the radomes 1500 to 1700 shown in FIGS. 15-1, 15-2, 16-1, 16-2, 17-1, 17-2, and 17-3 may be periodic, repeating, on an exterior surface of the facia that faces outward towards a field-of-view, on an interior surface of the facia, opposite the exterior surface, that faces inward towards an antenna, and/or on the interior and exterior surfaces, in various combinations of the above. It is clear, therefore, that there are many possible hemispheric patterns including indentations, as well as domes, bumps, or protrusions that are cylindrical in shape or varying from one row or column to the next, offsetting indentations, domes, protrusions, or bump outs instead of in-line features can be used, and other patterns of hemispherical indentations, domes, protrusions or bump-outs may be randomly or pseudo-randomly arranged in position.

Like the indentations above, each hemispherical indentation, dome, protrusion, or bump-out is sized to less than one wavelength of the center frequency of radar signals 116 of a transceiver of the system. To maximize transmission for a wide field-of-view at a nominal frequency, each unit cell that makes up an individual element of the pattern has a radius of the hemisphere r, a length L, and a width W, and a total thickness t of the radome can be adjusted accordingly. With a known dielectric constant Dk and a dissipation factor Df, the parameters r, L, W, and t may be tuned.

For example, as shown in FIGS. 15-1 and 15-2, the radome 1500 can be formed into a facia or other part of a vehicle. Each unit cell 1502 includes a hemispherical indentation within an exterior surface 1604 that faces a field-of-view, and a hemispherical indentation on an interior surface 1606 that faces an antenna for enabling transmissions within the field-of-view.

Figures 1, 16:
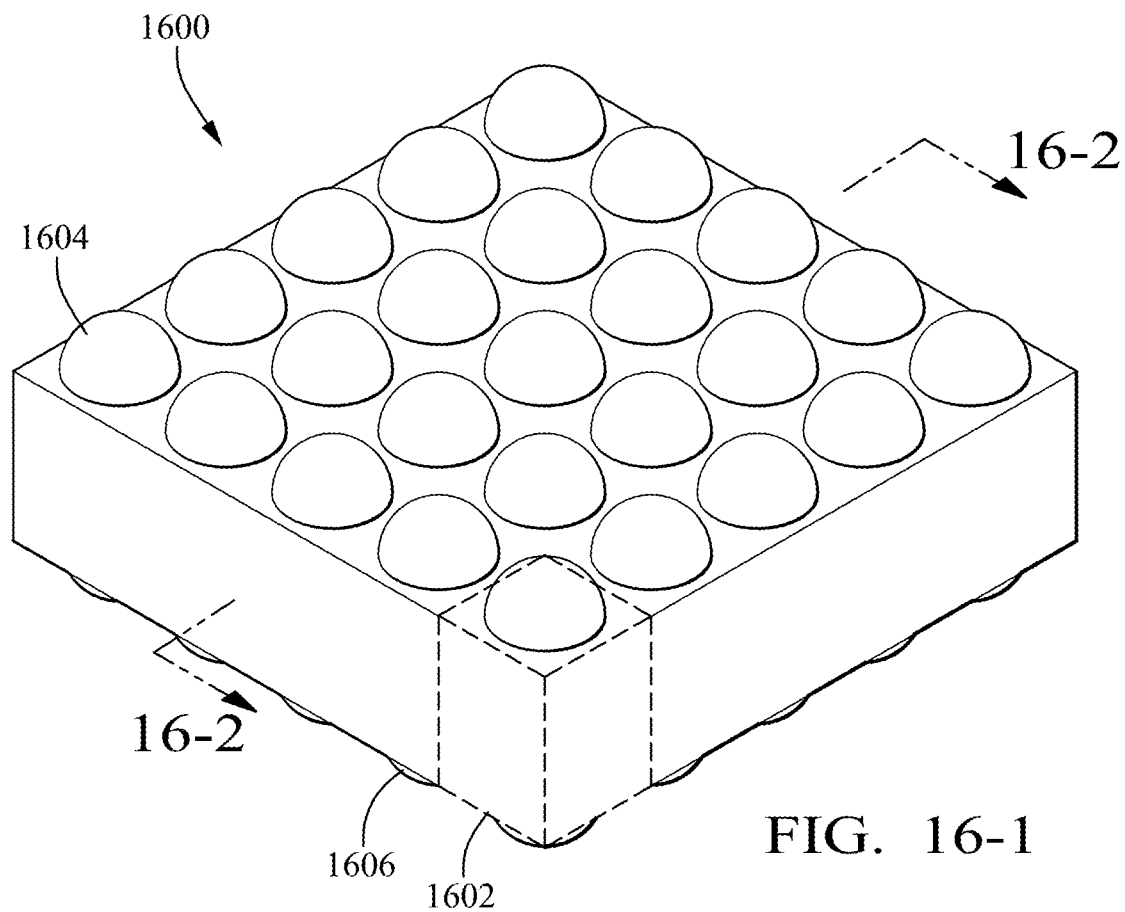
Figures 2, 16:
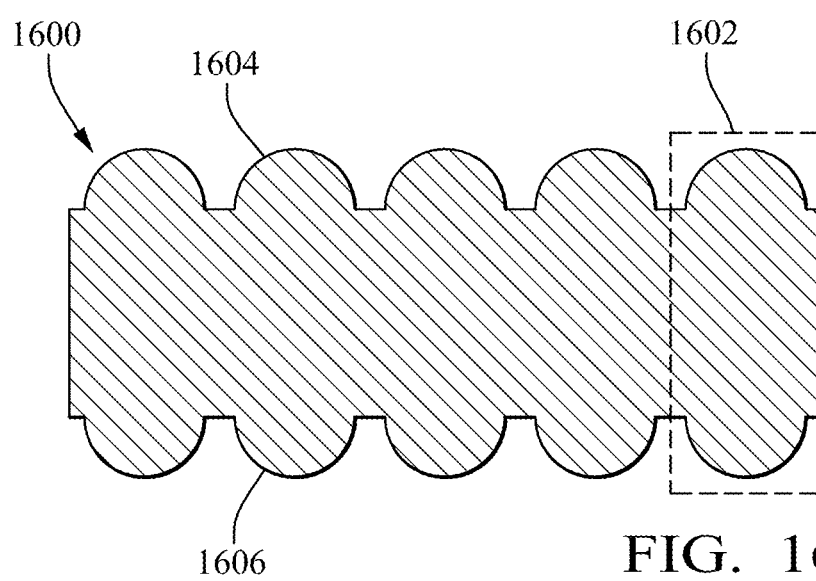

As another example, as shown in FIGS. 16-1 and 16-2, the radome 1600 can be formed into a facia or other part of a vehicle. Each unit cell 1602 includes a hemispherical dome, protrusion, or bump out on an exterior surface 1604 that faces a field-of-view, and a hemispherical dome, protrusion, or bump out on an interior surface 1606 that faces an antenna for enabling transmissions within the field-of-view.

Figures 1, 17:
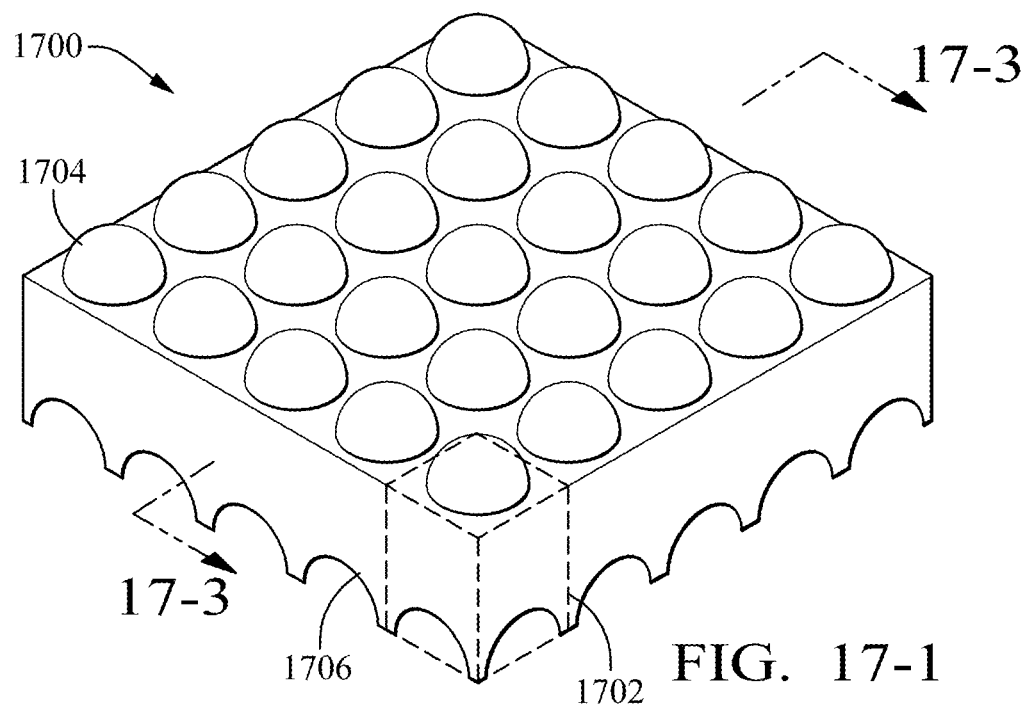
Figures 2, 17:
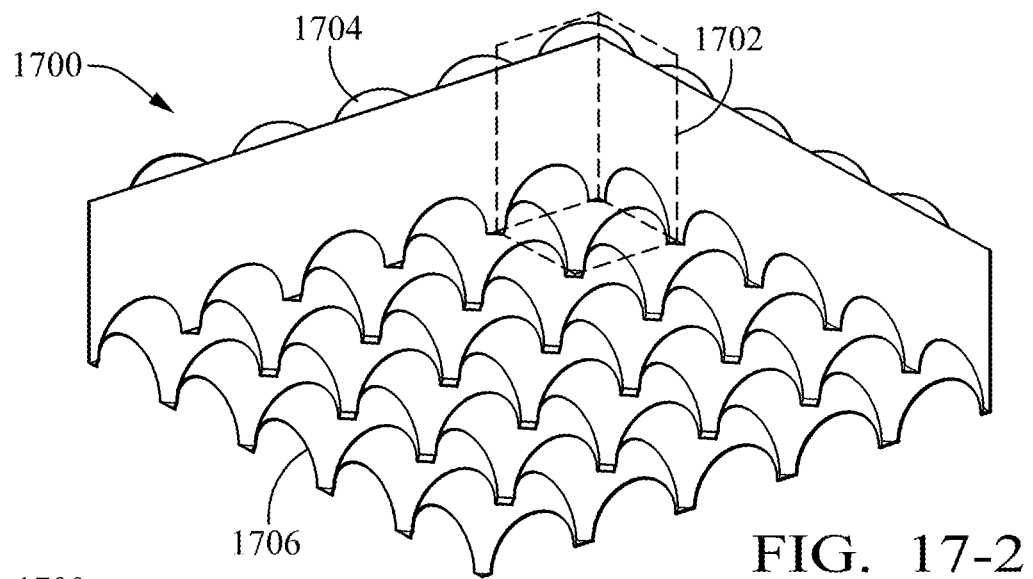
Figures 3, 17:
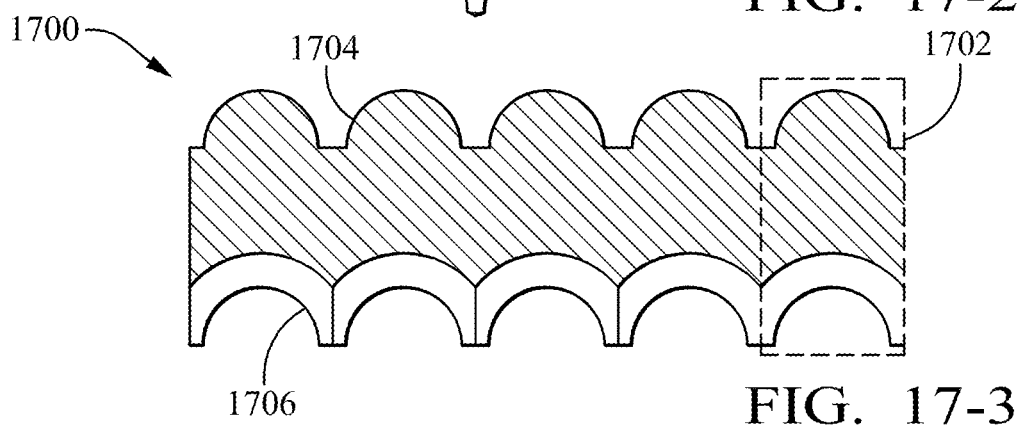

As yet another example, as shown in FIGS. 17-1 to 17-3, the radome 1700, can be formed into a facia or other part of a vehicle. Each unit cell 1702 includes a hemispherical dome, protrusion, or bump out on an exterior surface 1604 that faces a field-of-view, and a hemispherical indentation on an interior surface 1606 that faces an antenna for enabling transmissions within the field-of-view.

While primarily shown with identical unit cells, any of the example facia 108, and radomes 300 to 600, and 1500 to 1700, can include non-identical unit cells with gradient radius or depths to further tune the radomes to the desired characteristics. In other words, the facia 108, and the radomes 300 to 600, and the radomes 1500 to 1700 may include two or more groups of hemispherical indentations, domes, protrusions, and/or bump-outs, even on a same interior or exterior layer. For instance, a first group of hemispherical indentations domes, protrusions, and/or bump-outs from the pattern of hemispherical domes, protrusions, and/or bump-outs may include identical unit cells each having an equal portion of dielectric material. A second group of hemispherical domes, protrusions, and/or bump-outs may instead include a gradient radius or a gradient depth that is different than a radius or a depth of the hemispherical domes, protrusions, and/or bump-outs from the first group. These and other characteristics may be tuned to achieve desired radome transmission and reception characteristics. The overall shape and size of the facia 108, and the radomes 300 to 600, and the radomes 1500 to 1700 can vary depending on a particular use case and without having to machine pyramid shapes with sharp and accurate corners, manufacturing is easier than manufacturing other radomes.

Additional Examples

In the following section, additional examples of a radome supporting an ultra-wide field-of-view are provided.

Example 1. A system comprising: an antenna including an array of elements directed towards a field-of-view; and a facia for a vehicle and configured to be arranged between the antenna and the field-of-view, the facia having an exterior surface exposed to the field-of-view and an interior surface that is opposite the exterior surface and exposed to the array of elements, the facia is configured as a radome having on at least one of the interior surface or the exterior surface a respective pattern of hemispherical indentations or domes that are configured to trap light, the trapping of the light being effective to reduce reflections off that surface and increase light transmission through the facia to support an ultra-wide field-of-view using the antenna despite the facia obstructing the field of view.

Example 2. The system of any preceding example, wherein the facia is configured as a flat radome, and the antenna comprises a planar antenna including the array of elements arranged in a two-dimensional grid.

Example 3. The system of any preceding example, wherein the interior surface is arranged parallel to the array of elements.

Example 4. The system of any preceding example, wherein each of the hemispherical indentations or domes comprises an opening that is perpendicular to the array of elements.

Example 5. The system of any preceding example, wherein the interior surface is configured to form a plane of incidence that is perpendicular to a polarization of an incident wave to the facia.

Example 6. The system of any preceding example, wherein the facia comprises a dielectric material.

Example 7. The system of any preceding example, wherein each hemispherical indentation or dome in the pattern of hemispherical indentations comprises an identical unit cell comprising an equal portion of the dielectric material.

Example 8. The system of any preceding example, wherein a radius of each identical unit cell in the pattern of hemispherical indentations or domes exceeds half of an outer dimension of the unit cell.

Example 9. The system of any preceding example, wherein a thickness of each identical unit cell in the pattern of hemispherical indentations or domes exceeds the outer dimension of the unit cell.

Example 10. The system of any preceding example, wherein each hemispherical indentation or dome in the pattern of hemispherical indentations comprises a unit cell comprising an equal portion of the dielectric material, each unit cell being defined by a particular size and shape that configures each unit cell to trap a portion of the light.

Example 11. The system of any preceding example, wherein the particular size and shape that configures each unit cell to trap the portion of the light includes a tunnel opening between each hemispherical indentation or dome in the pattern of hemispherical indentations or domes and the field-of-view.

Example 12. The system of any preceding example, wherein each tunnel opening comprises a rectangular opening or a circular opening.

Example 13. The system of any preceding example, wherein each hemispherical indentation or dome in the pattern of hemispherical indentations or domes is recessed at a depth into the interior surface.

Example 14. The system of any preceding example, wherein transmission characteristics of the facia indicate a transmission gain at an incident angle of zero degrees to be approximately the same as a transmission gain at an incident angle with a magnitude exceeding forty degrees.

Example 15. The system of any preceding example, wherein transmission characteristics of the facia at boresight are approximately equal to transmission characteristics of the facia at greater than forty-five degrees.

Example 16. The system of any preceding example, wherein the transmission characteristics of the facia at the boresight is approximately equal to transmission characteristics of the facia at approximately sixty degrees.

Example 17. The system of any preceding example, wherein the facia comprises a curved facia configured as a radome for a non-planar antenna array of elements.

Example 18. The system of any preceding example, wherein each hemispherical indentation or domes from the pattern of hemispherical indentations or domes is sized to less than one wavelength of the center frequency of radar signals transmitted or received via the array of elements.

Example 19. The system of any preceding example, wherein the facia comprises a dielectric material, and a first group of hemispherical indentations or domes from the pattern of hemispherical indentations or domes comprise identical unit cells comprising an equal portion of the dielectric material, and a second group of hemispherical indentations or domes from the pattern of hemispherical indentations or domes comprises a gradient radius or a gradient depth that is different than a radius or a depth of the hemispherical indentations or domes from the first group.

Example 20. An apparatus comprising: a facia for a vehicle and configured to be arranged between an array of elements of an antenna and a field-of-view, the facia having an exterior surface exposed to the field-of-view and an interior surface exposed to the array of elements, the facia is configured as a radome for supporting an ultra-wide field-of-view with the antenna despite the facia obstructing the field of view, wherein one of the exterior surface or the interior surface has a mostly smooth surface or a pattern of hemispherical indentations or domes that are configured to reduce reflections off that surface and increase light transmission through the facia, and wherein another of the exterior surface or the interior surface has a pattern of hemispherical indentations or domes that are configured to reduce reflections off that surface and further increase light transmission through the facia.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims. Problems associated with one problem solved deterioration of transmission characteristics at the edges of an ultra-wide field-of-view of a planar antenna array may be overcome by a facia (e.g., a radome) according to the described techniques. Therefore, although described as a way to improve vehicle performance, the techniques of the foregoing description can be applied to other transmission problems to obtain an ultra-wide field-of-view, for instance, when using a planar antenna array.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A system comprising:
   an antenna including an array of elements directed towards a field-of-view; and
   a facia for a vehicle and configured to be arranged between the antenna and the field-of-view, the facia having an exterior surface exposed to the field-of-view and an interior surface that is opposite the exterior surface and exposed to the array of elements,
   the facia is configured as a radome having on the interior surface and the exterior surface a respective pattern of unit cells each with hemispherical indentations that are configured to trap light, the trapping of the light being effective to reduce reflections off that surface and increase light transmission through the facia to support an ultra-wide field-of-view using the antenna despite the facia obstructing the field of view,
   wherein:
   each one of the unit cells with the hemispherical indentations on the interior surface and the exterior surface includes a radius, a length, a width, and a total thickness of the radome,
   the radius is greater than one-half the length,
   the total thickness is greater than the length, and
   the total thickness is greater than the width.

2. The system of claim 1, wherein the facia is configured as a flat radome, and the antenna comprises a planar antenna including the array of elements arranged in a two-dimensional grid.

3. The system of claim 1, wherein the interior surface is arranged parallel to the array of elements.

4. The system of claim 1, wherein each of the hemispherical indentations comprises an opening that is perpendicular to the array of elements.

5. The system of claim 1, wherein the interior surface is configured to form a plane of incidence that is perpendicular to a polarization of an incident wave to the facia.

6. The system of claim 1, wherein the facia comprises a dielectric material.

7. The system of claim 6, wherein each hemispherical indentation in the pattern of hemispherical indentations comprises an identical unit cell comprising an equal portion of the dielectric material.

8. The system of claim 7, wherein each hemispherical indentation in the pattern of hemispherical indentations comprises a unit cell comprising an equal portion of the dielectric material, each unit cell being defined by a particular size and shape that configures each unit cell to trap a portion of the light.

9. The system of claim 8, wherein the particular size and shape that configures each unit cell to trap the portion of the light includes a tunnel opening between each hemispherical indentation in the pattern of hemispherical indentations and the field-of-view.

10. The system of claim 9, wherein each tunnel opening comprises a rectangular opening or a circular opening.

11. The system of claim 1, wherein each hemispherical indentation in the pattern of hemispherical indentations or domes is recessed at a depth into the interior surface.

12. The system of claim 1, wherein transmission characteristics of the facia indicate a transmission gain at an incident angle of zero degrees to be approximately the same as a transmission gain at an incident angle with a magnitude exceeding forty degrees.

13. The system of claim 1, wherein transmission characteristics of the facia at boresight are approximately equal to transmission characteristics of the facia at greater than forty-five degrees.

14. The system of claim 13, wherein the transmission characteristics of the facia at the boresight is approximately equal to transmission characteristics of the facia at approximately sixty degrees.

15. The system of claim 1, wherein the facia comprises a curved facia configured as a radome for a non-planar antenna array of elements.

16. The system of claim 1, wherein each hemispherical indentation from the pattern of hemispherical indentations is sized to less than one wavelength of the center frequency of radar signals transmitted or received via the array of elements.

17. The system of claim 1, wherein the facia comprises a dielectric material, and a first group of hemispherical indentations from the pattern of hemispherical indentations comprise identical unit cells comprising an equal portion of the dielectric material, and a second group of hemispherical indentations or domes from the pattern of hemispherical indentations comprises a gradient radius or a gradient depth that is different than a radius or a depth of the hemispherical indentations from the first group.

18. An apparatus comprising:
a facia for a vehicle and configured to be arranged between an array of elements of an antenna and a field-of-view, the facia having an exterior surface exposed to the field-of-view and an interior surface exposed to the array of elements,
the facia is configured as a radome for supporting an ultra-wide field-of-view with the antenna despite the facia obstructing the field of view,
wherein each one of the exterior surface and the interior surface has a pattern of unit cells each with hemispherical indentations that are configured to reduce reflections off that surface and increase light transmission through the facia,
wherein:
    each one of the unit cells with the hemispherical indentations on the interior surface and the exterior surface includes a radius, a length, a width, and a total thickness of the radome,
    the radius is greater than one-half the length,
    the total thickness is greater than the length, and
    the total thickness is greater than the width.

\* \* \* \* \*